United States Patent
Kim

(10) Patent No.: US 10,952,257 B2
(45) Date of Patent: Mar. 16, 2021

(54) ACCESS METHOD IN COMMUNICATION SYSTEM AND DEVICE FOR PERFORMING SAME

(71) Applicant: Electronics and Telecommunications Research Institute, Daejeon (KR)

(72) Inventor: Jae Heung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 43 days.

(21) Appl. No.: 16/463,754

(22) PCT Filed: Oct. 31, 2017

(86) PCT No.: PCT/KR2017/012177
§ 371 (c)(1),
(2) Date: May 23, 2019

(87) PCT Pub. No.: WO2018/097497
PCT Pub. Date: May 31, 2018

(65) Prior Publication Data
US 2019/0387548 A1     Dec. 19, 2019

(30) Foreign Application Priority Data

Nov. 23, 2016  (KR) .......... 10-2016-0156830
Dec. 6, 2016   (KR) .......... 10-2016-0165166
Jan. 3, 2017   (KR) .......... 10-2017-0000933

(51) Int. Cl.
*H04W 4/00*     (2018.01)
*H04W 74/08*    (2009.01)
(Continued)

(52) U.S. Cl.
CPC ... *H04W 74/0833* (2013.01); *H04W 72/0406* (2013.01); *H04W 76/11* (2018.02)

(58) Field of Classification Search
None
See application file for complete search history.

(56) References Cited

U.S. PATENT DOCUMENTS 8,929,334 B2    1/2015  Wang et al.
9,237,588 B2    1/2016  Cha et al.
(Continued)

FOREIGN PATENT DOCUMENTS

KR    1020090122225 A    11/2009
KR    1020100103622 A    9/2010
(Continued)

OTHER PUBLICATIONS

Ericsson, "Random Access enhancements", 3GPP TSG-RAN WG2 #95bis, Tdoc R2-166826, Oct. 10-14, 2016, pp. 1-5.

*Primary Examiner* — Phirin Sam
(74) *Attorney, Agent, or Firm* — Rabin & Berdo, P.C.

(57) ABSTRACT

An operation method of a terminal in a wireless communication system is disclosed. The operation method of the terminal comprises the steps of: receiving common information from any one among a plurality of base stations; and performing a random access procedure with a first base station among the plurality of base stations by using the common information, wherein the step of performing the random access procedure includes the steps of: transmitting a random access preamble; receiving a random access response; and transmitting an uplink message (RACH MSG3). Therefore, a performance of the communication system can be improved.

18 Claims, 13 Drawing Sheets

(51) Int. Cl.
*H04W 76/11* (2018.01)
*H04W 72/04* (2009.01)

(56) References Cited

U.S. PATENT DOCUMENTS

| | | | |
|---|---|---|---|
| 9,503,982 | B2 | 11/2016 | Lu et al. |
| 9,549,417 | B2 | 1/2017 | Olsson et al. |
| 10,091,821 | B2 * | 10/2018 | Wager .................. H04L 41/0813 |
| 2009/0163211 | A1 | 6/2009 | Kitazoe et al. |
| 2010/0085926 | A1 | 4/2010 | Harada et al. |
| 2010/0329182 | A1 | 12/2010 | Wigard et al. |
| 2013/0010593 | A1 | 1/2013 | Cha et al. |
| 2015/0289292 | A1 * | 10/2015 | Sun ..................... H04L 27/2646 370/329 |
| 2015/0365968 | A1 * | 12/2015 | Kim .................. H04W 72/1268 370/280 |
| 2016/0105911 | A1 | 4/2016 | Kim et al. |
| 2016/0157148 | A1 * | 6/2016 | Kato ................. H04W 36/0055 455/444 |
| 2016/0183323 | A1 | 6/2016 | Rahman et al. |
| 2017/0048810 | A1 * | 2/2017 | Sahlin ............... H04W 56/0045 |
| 2018/0206270 | A1 * | 7/2018 | Fan ....................... H04W 48/12 |
| 2019/0312711 | A1 * | 10/2019 | Stern-Berkowitz ......................... H04L 5/0053 |
| 2019/0394810 | A1 * | 12/2019 | Patel .................. H04W 74/0891 |
| 2020/0196262 | A1 * | 6/2020 | Kwon ................. H04W 56/001 |
| 2020/0229167 | A1 * | 7/2020 | Kim .................. H04W 72/1268 |

FOREIGN PATENT DOCUMENTS

| | | |
|---|---|---|
| KR | 101226537 B1 | 1/2013 |
| KR | 1020140042924 A | 4/2014 |
| KR | 1020150042689 A | 4/2015 |
| WO | 2009058832 A1 | 5/2009 |
| WO | 2015053553 A1 | 4/2015 |

* cited by examiner

ACCESS METHOD IN COMMUNICATION SYSTEM AND DEVICE FOR PERFORMING SAME

TECHNICAL FIELD

The present invention relates to a method for accessing a communication system, and more particularly, to a random access procedure using a variable message.

BACKGROUND ART

A communication system (hereinafter, an 'integrated communication system') using a higher frequency band (e.g., a frequency band of 6 GHz or higher) than a frequency band (e.g., a frequency band lower below 6 GHz) of a long term evolution (LTE) based communication system (or, a LTE-A based communication system) is being considered for processing of soaring wireless data. The reception performance of a signal may deteriorate due to path loss of a radio wave and reflection of the radio wave in such the high frequency band (e.g., a frequency band of 6 GHz or higher), and a small base station supporting smaller cell coverage than that of a macro base station can be introduced into the integrated communication system in order to solve this problem. In the integrated communication system, the small base station may be connected to a core network using a wired backhaul link.

Meanwhile, in the integrated communication system, a terminal may perform a random access procedure for connection with a base station. In the random access procedure, messages may be exchanged between the terminal and the base station. The formats of the messages used in the random access procedure needs to be changed according to the size of an identifier of the terminal, the type and size of the information to be transmitted by the terminal. However, since the formats of the messages used in the current random access procedure are fixed, there is a problem that the random access procedure cannot be efficiently performed.

DISCLOSURE

Technical Problem

The objective of the present invention to solve the above-described problem is to provide operation methods of a terminal and a base station, in which a size and a format of a message transmitted by the terminal are variable in a random access procedure for a communication system, and the base station is able to identify the format of the message.

Technical Solution

An operation method of a terminal according to a first embodiment of the present invention for achieving the above-described objective may comprise receiving common information from one of a plurality of base stations; and performing a random access procedure with a first base station among the plurality of base stations by using the common information, wherein the performing a random access procedure comprises transmitting a radon access preamble to the first base station; receiving a random access response from the first base station in response to the random access preamble; and transmitting an uplink message to the first base station, wherein the uplink message includes a field indicating information related to a format of the uplink message.

Here, the uplink message may include a first field indicating a size of an identifier of the terminal.

Here, the uplink message may include a second field indicating what information included in the uplink message is.

Here, the uplink message may include at least one of an uplink buffer size, a radio channel measurement result, a random access attempt reason, capability of the terminal, a mobility state of the terminal, a location of the terminal, and control signaling information for a connection request.

Here, the common information may include resource allocation information grouped according to a size of an identifier of the terminal, and in the transmitting a random access preamble to the first base station, the random access preamble may be transmitted by using a radio resource corresponding to the size of the identifier of the terminal based on the resource allocation information.

Here, the random access response may include an indication field indicating a type of information included in the uplink message, and in the transmitting an uplink message to the first base station, the uplink message may be generated and transmitted as including the information indicated by the indication field.

Here, the uplink message may include uplink data and a third field indicating a size of the uplink data.

Here, the uplink message may include an identifier of the terminal and a payload.

Here, the random access response may include information on a size of the payload, and the uplink message may be generated in a format predetermined by the size of the payload.

Here, the uplink message may include a fourth field indicating the size of the payload.

Here, the uplink message may include a fifth field indicating a type of information included in the payload.

Here, the fifth field may indicate that the payload includes data or control signaling information.

An operation method of a terminal according to a second embodiment of the present invention for achieving the above-described objective may comprise receiving common information from one of the plurality of base stations; and performing a random access procedure with a first base station among the plurality of base stations by using the common information, wherein the performing a random access procedure comprises transmitting a radon access request message including a random preamble and a random access payload to the first base station; and receiving a random access response from the first base station in response to the random access request message, wherein the random access payload includes a field indicating an identifier of the terminal and a format of the random access payload.

Here, the random access payload may include a first field indicating a size of an identifier of the terminal.

Here, the random access payload may include a second field indicating a type of information included in the random access payload.

Here, the common information may include resource allocation information grouped according to a size of an identifier of the terminal, and in the transmitting a random access request message to the first base station, the random access request message may be transmitted by using a radio resource corresponding to the size of the identifier of the terminal.

Here, the random access payload may include a third field indicating a size of the random access payload.

An operation method of a base station according to a third embodiment of the present invention for achieving the above-described objective may comprise receiving a random access preamble from a terminal; transmitting a random access response to the terminal in response to the random access preamble; receiving an uplink message from the terminal; and transmitting request information according to the uplink message to the terminal, wherein, in the receiving an uplink message, information related to a format of the uplink message is identified based on at least one field included in the uplink message.

Here, in the receiving an uplink message, at least one of a size of an identifier of the terminal included in the uplink message, a size of a payload of the uplink message, and a type of information included in the uplink message may be identified based on the at least one field.

Here, a size of an identifier of the terminal included in the uplink message may be determined from a radio resource through which the random access preamble is transmitted.

Advantageous Effects

According to the present invention, the terminal can change the format of the message to be used in the random access procedure as needed. The base station can obtain information related to the format of the message by identifying a field included in the message or by identifying the radio resources through which the terminal transmitted the message. Therefore, the performance of the communication system can be improved.

MODES OF THE INVENTION

Figure 1:
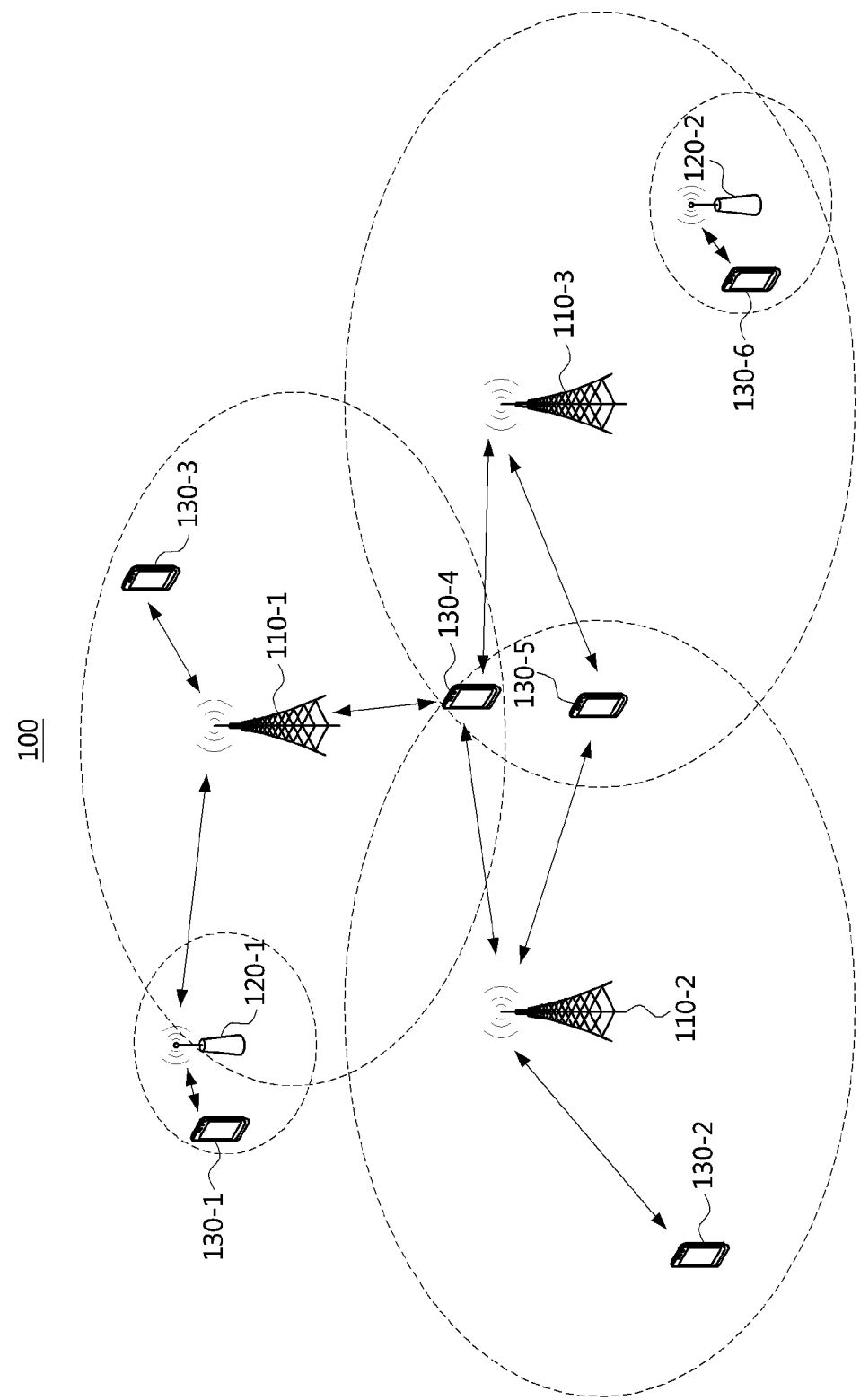
FIG. 1 is a conceptual diagram illustrating a communication system according to an embodiment of the present invention.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Hereinafter, communication systems to which embodiments according to the present invention will be described. However, the communication systems to which the embodiments according to the present invention are applied are not restricted to what will be described below. That is, the embodiments according to the present invention may be applied to various communication systems. Here, the communication system may be used in the same sense as a communication network.

FIG. 1 is a conceptual diagram illustrating a first embodiment of a cellular communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like).

The plurality of communication nodes may support 4G communication (e.g., long term evolution (LTE), LTE-advanced (LTE-A)), or 5G communication defined in the 3rd generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a space division multiple access (SDMA) based communication protocol, a communication protocol based on a radio access technology (RAT) capable of multiple accesses according to a massive antenna beamforming scheme, and the like. Each of the plurality of communication nodes may have the following structure.

Figure 2:
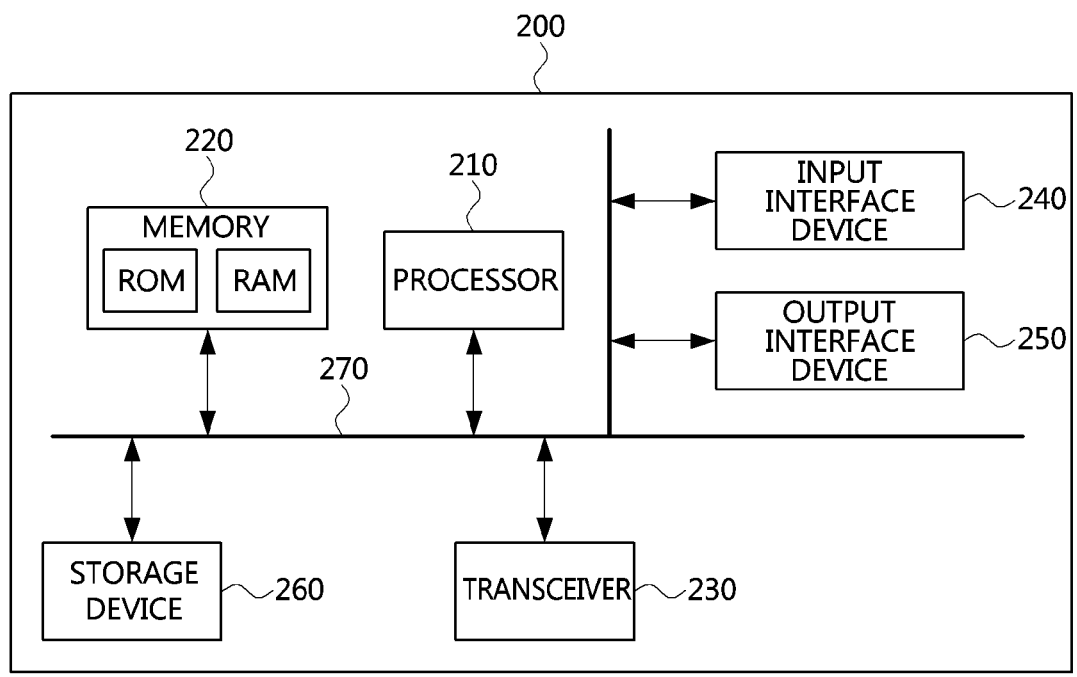
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 comprising the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may be referred to as an advanced base station (ABS), a high reliability-base station (HR-BS), a Node B (NodeB), an evolved Node B (eNodeB), a gNB, a base transceiver station (BTS), a radio base station, a radio transceiver, an access point (AP)), an access node, a radio access station (RAS), a mobile multihop relay-base station (MMR-BS), a relay station (RS), an advanced relay station (ARS), a high reliability-relay station (HR-RS), a small base station, a femto base station, a pico base station, a macro base station, a micro base station, a home NodeB (HNB), a home eNodeB (HeNB), a road side unit (RSU), a radio remote head (RRH), a transmission point (TP), a transmission and reception point (TRP), or the like. Also, each of the plurality of base stations 110-1, 110-2, 110-3, 120-1, and 120-2 can perform all or a part of functions of the above-described entities (e.g., ABS, NodeB, eNodeB, AP, RAS, BTS, MMR-BS, RS, RN, ARS, HR-RS, small base station, RSU, RRH, TP, TRP, etc.).

Each of the plurality of terminals 130-1, 130-2, 130-3, 130-4, 130-5, and 130-6 may be referred to as a user equipment (UE), a terminal equipment (TE), a mobile terminal (MT), a mobile station, an advanced mobile station (AMS), a high reliability-mobile station (HR-MS), a subscriber station (SS), a portable subscriber station (PSS), an access terminal (AT), a device, a station, an Internet of Things (IoT) device, a mounted module, an on board unit (OBU), or the like. Also, each of the plurality of terminals 130-1, 130-2, 130-3, 130-4, 130-5, and 130-6 can perform all or a part of functions of the above-described entities (e.g., MT, MS, AMS, HR-MS, SS, PSS, AT, UE, IoT device, mounted module, etc.).

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in a communication system, a base station may perform all functions (e.g., remote radio transmission and reception function, baseband processing function, and the like) according to a communication protocol. Alternatively, the remote radio transmission and reception function among all the functions according to the communication protocol may be performed by a transmission reception point (TRP), and the baseband processing function among all the functions according to the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of a backhaul link and a fronthaul link may be as follows. When a function-split technique of the communication protocol is applied, the TRP may selectively perform some functions of the BBU or some functions of a MAC/RLC layer.

Meanwhile, a random access procedure may be classified into a random access procedure for initial access (hereinafter referred to as an 'initial random access procedure') and a random access procedure for a non-initial access (hereinafter referred to as a 'non-initial random access procedure'). The initial random access procedure may be performed without context information. The context information may be RRC context information, access stratum (AS) configuration information, and the like. The context information may include RRC configuration information for a terminal, security configuration information for the terminal, packet data convergence protocol (PDCP) information (e.g., PDCP information according to a robust header compression (ROHC) mode) for the terminal, an identifier of the terminal (e.g., a cell-radio network temporary identifier (C-RNTI)), an identifier of a base station, and the like. The identifier of the terminal may be an identifier used to uniquely identify the terminal in a cell. Alternatively, the identifier of the terminal may be an identifier used to uniquely identify the terminal in a local area formed by a plurality of cells.

The non-initial random access procedure may be performed for a communication procedure according to arrival of transmission data (or, reception data), a connection resume procedure, a resource allocation request procedure, a terminal-based transmission request procedure, a link reconfiguration procedure after a radio link failure (RLF), a mobility support procedure (e.g., a handover procedure), a procedure for adding/changing a secondary cell, a procedure for adding/changing an active beam, an access request procedure for acquiring synchronization, and the like.

The initial random access procedure or the non-initial random access procedure may be performed according to an operation state of the terminal. The operation states of the terminal may be as follows.

Figure 3:
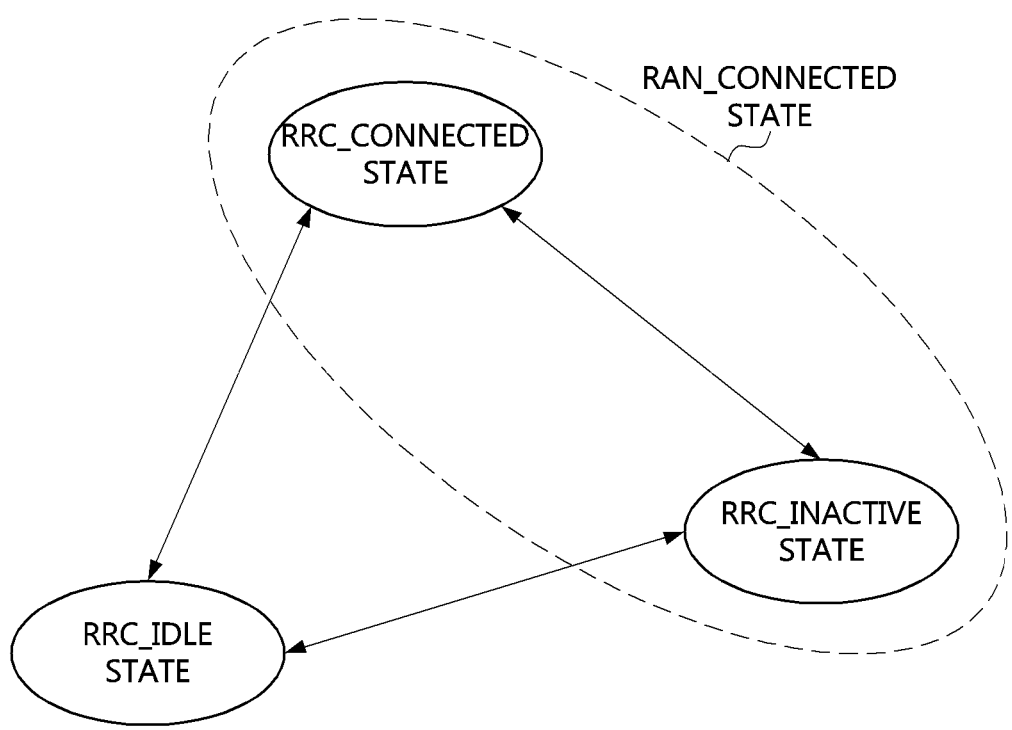
FIG. 3 is a conceptual diagram illustrating operation states of a terminal in a communication system.

FIG. 3 is a conceptual diagram illustrating operation states of a terminal in a communication system.

Referring to FIG. 3, the terminal may operate in an RRC_IDLE state, an RRC_CONNECTED state, or an RRC_INACTIVE state. A RAN_CONNECTED state may include the RRC_CONNECTED state and the RRC_INACTIVE state. In the RAN_CONNECTED state, the base station and the terminal may store and manage context information, connection configuration information, and the like. That is, the RAN_CONNECTED state is a connected state in that the context information or the connection configuration information is stored and managed between a network and the terminal, and may be distinguished from the connected state of a RRC connection perspective. For example, the connected state of the RRC connection perspective may mean that a data radio bearer is configured and maintained. For the terminal operating in the RRC_CONNECTED state, a control channel, a reference signal, and the like used for connection configuration maintenance and data transmission and reception procedures may be configured. The reference signal may be a demodulation reference signal (DMRS) used for demodulating data, an SRS used for measuring a channel quality, a reference signal used for beamforming, and the like. Accordingly, the terminal operating in the RRC_CONNECTED state may perform the data transmission and reception procedures without any latency.

The context information, connection configuration information, and the like for the terminal operating in the RRC_INACTIVE state may be stored and managed in the base station and the corresponding terminal. However, in the RRC_INACTIVE state, the terminal may operate similarly to the RRC_IDLE state. Therefore, the terminal operating in the RRC_INACTIVE state may perform the non-initial random access procedure to perform data transmission and reception procedures because the data radio bearer is released or the configuration of the data radio bearer is stopped. When the non-initial random access procedure is completed, the operation state of the terminal may transition from the RRC_INACTIVE state to the RRC_CONNECTED state, and the terminal operating in the RRC_CONNECTED state may perform data transmission and reception procedures by using the configured data radio bearer. Alternatively, the terminal in the RRC_INACTIVE state may transmit data of a limited size, data according to a limited service quality, data according to a limited service, and the like.

In the RRC_IDLE state, the connection between the base station and the terminal may not be established, and the context information and connection configuration information of the terminal may not be stored in the base station and the corresponding terminal. Therefore, the terminal operating in the RRC_IDLE state may perform the initial random access procedure. In this case, the operation state of the terminal may transition from the RRC_IDLE state to the RRC_CONNECTED state.

Alternatively, the operation state of the terminal may transition from the RRC_IDLE state to the RRC_INACTIVE state according to a control of the base station, and a limited service may be provided for the terminal operating in the RRC_INACTIVE state. Here, the operation state of the terminal may be transited from the RRC_IDLE state to the RRC_INACTIVE state by a random access procedure defined separately. Whether or not to perform the transition from the RRC_IDLE state to the RRC_INACTIVE state may be determined according to the type of the terminal, the capability of the terminal, the type of the service, and the like. The base station (or, a control entity of the communication system) may set a transition condition from the RRC_IDLE state to the RRC_INACTIVE state, and may control the transition operation from the RRC_IDLE state to the RRC_INACTIVE state according to the transition condition. For example, when the base station (or, a control entity of the communication system) permits the transition from the RRC_IDLE state to the RRC_INACTIVE state, the operation state of the terminal may transition from the RRC_IDLE state to the RRC_INACTIVE state.

On the other hand, resources for the above-described random access procedure may be cell-specific resources. When common resources for the random access procedure are configured in a plurality of cells (e.g., a plurality of base stations), an identifier or a virtual cell identifier for distinguishing a specific area may be used for identifying the common resources. For example, common resources for the initial random access procedure may be identified by a virtual cell identifier. When the virtual cell identifier includes a downlink identifier and an uplink identifier, downlink resources among the common resources may be identified by the downlink identifier, and uplink resources among the common resources may be identified by the uplink identifier.

When a frequency division duplex (FDD) scheme is used in the communication system, downlink resources and uplink resources may always exist. On the other hand, when a time division duplex (TDD) scheme is used in the communication system, downlink resources and uplink resources may exist independently for each base station. In a TDD-based communication system, when a plurality of base stations use the same uplink-downlink (UL-DL) configuration, common resources for the plurality of base stations may be configured. The terminal may obtain configuration information of the common resources from an arbitrary base station belonging to a group of the base stations (e.g., a group of the base stations sharing the common resources). Therefore, locations of the common resources in the time axis may be configured to belong to resources (e.g., downlink resources, uplink resources) that all the base stations belonging to the group have in common.

For example, when common resources are used for downlink transmission, resources that all the base stations belonging to the base station group configure as downlink resources (e.g., downlink subframe) may be configured as the common resources. When common resources are used for uplink transmission or sidelink transmission, resources that all the base stations belonging to the base station group configure as uplink resources (e.g., uplink subframe) may be configured as the common resources.

Meanwhile, when the FDD scheme is used in the new radio (NR) communication system, downlink resources and uplink resources may always exist. On the other hand, when the TDD scheme is used in the NR communication system, downlink resources and uplink resources may exist independently for each base station. For example, when a dynamic TDD scheme is used in the NR communication system, a location of each of a downlink subframe (or, a downlink slot) and an uplink subframe (or, an uplink slot) in one base station may be different from a location of each of a downlink subframe (or, a downlink slot) and an uplink subframe (or, an uplink slot) in another base station.

Some of the plurality of base stations sharing the common resources may operate based on the dynamic TDD scheme, and the remaining base stations may operate based on a semi-static TDD scheme. Alternatively, all the base stations sharing the common resources may operate based on the dynamic TDD scheme. When the dynamic TDD scheme is used in the NR communication system, a type of resources located in a specific region on the time axis may be fixed as downlink resources or uplink resources, and the resources fixed as downlink resources or uplink resources may be configured as the common resources. A pattern of the fixed resources may be indicated by a period and an offset. The base station may inform the terminal of the period and offset indicating the pattern of the fixed resources through a system information transmission procedure or a separate control information signaling procedure, and the terminal may identify the pattern of the fixed resources based on the obtained period and offset.

For example, the fixed resources may be radio resource management (RRM) measurement resources, resources for the random access procedure (e.g., physical random access channel (PRACH)), or the like. The base station may configure downlink resources (e.g., subframe, slot, mini-slot, symbol) for RRM measurement according to a preset period (e.g., 40 ms), and transmit RRM reference signal (RS) by using the configured downlink resources. Also, the base station may configure uplink resources (e.g., subframe, slot, mini-slot, symbol) for the random access procedure according to a preset period (e.g., 2 ms).

Figure 4:
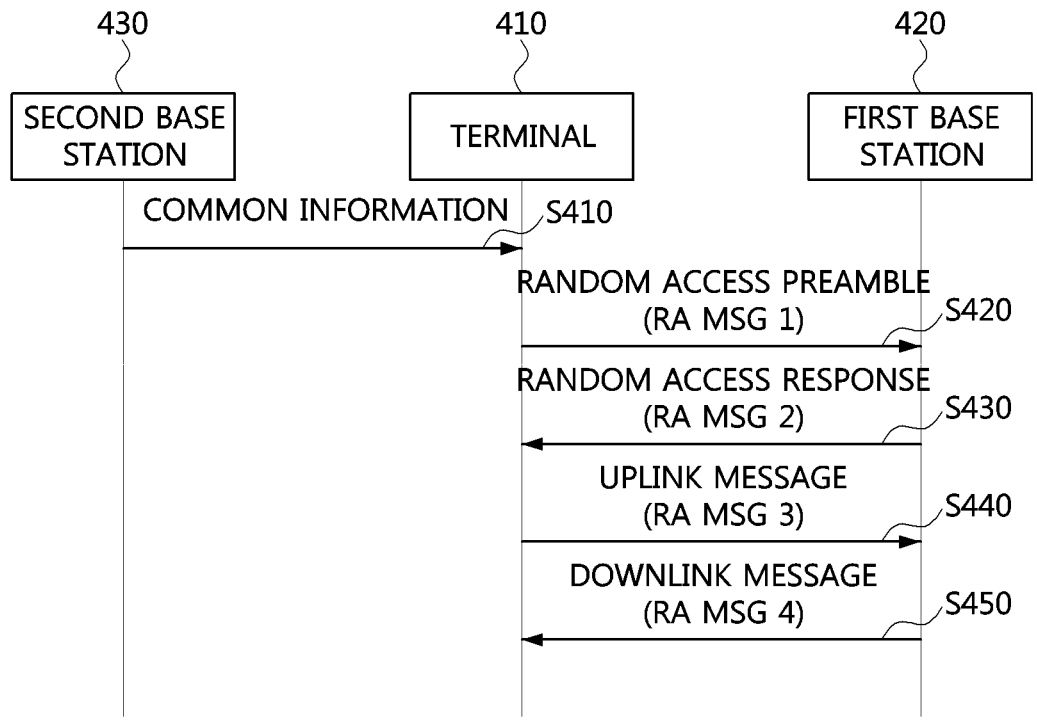
FIG. 4 is a sequence chart illustrating a first embodiment of a random access procedure in a communication system.

FIG. 4 is a sequence chart illustrating a first embodiment of a random access procedure in a communication system.

Referring to FIG. 4, a communication system may include a terminal 410, a first base station 420, a second base station 430, and the like. Each of the terminal 410, the first base station 420 and the second base station 430 may be configured to be the same as or similar to the communication node 200 shown in FIG. 2.

The second base station 430 may transmit common information through the common resources (S410). The common information may be configured identically in a plurality of base stations (e.g., first base station 420, second base station 430). The common information may include system information, control information, physical channel configuration/allocation information, reference signal configuration/allocation information, resource allocation information, a service area (SA) identifier indicating a service area to which the common information is applied, a duration indicator indicating a duration during which the common information is applied effectively, and the like. The resource allocation information may include resource allocation information for a control channel, resource allocation information for a random access procedure, resource allocation information for a scheduling request procedure (e.g., a resource request procedure), resource allocation information for a downlink transmission request procedure, resource allocation information for D2D communications, and the like. The resource allocation information may include a parameter indicating a frequency resource (e.g., reference value, offset), a parameter indicating a time resource (e.g., reference value, offset), a resource hopping pattern, beamforming-related information, a code sequence (e.g., bit sequence, signal sequence), a deactivated radio resource region (or, duration), and the like.

The terminal 410 may belong to the cell coverage of the second base station 430, and may be in a state in which the connection establishment procedure between the terminal 410 and the second base station 430 is completed. The terminal 410 may receive the common information from the second base station 430, and identify the resource allocation information for the random access procedure (or, downlink transmission request procedure) included in the common information. The resource allocation information for the random access procedure (or, downlink transmission request procedure) may include a parameter indicating a frequency resource, a parameter indicating a time resource, a resource hopping pattern, beamforming-related information, a code sequence (e.g., bit sequence, signal sequence), and the like.

Meanwhile, the second base station 430 may transmit the common information based on a beam sweeping scheme (e.g., a downlink burst transmission scheme). In this case, the common information may be transmitted in a plurality of virtual sectors of the second base station 430 in a time division multiplex (TDM) scheme. For example, the second base station 430 may configure broadcast information (e.g., mapping relationship between resources for transmission of downlink control information and resources for a random access procedure) for each virtual sector, and transmit the broadcast information through the common resources based on the beam sweeping scheme. Considering signaling overhead in the communication system, it is desirable that the same mapping relationship is established in the virtual sectors of the second base station 430. In this case, the second base station 430 may repeatedly transmit the same broadcast information based on the downlink burst transmission scheme. Even when the terminal 410 receives the broadcast information only once from the second base station 430, the terminal 410 may identify the broadcast information of the second base station 430.

When the terminal 410 moves from the cell coverage of the second base station 430 to the cell coverage of the first base station 420, the terminal 410 may perform communications (e.g., random access procedure, downlink transmission request procedure, and the like) with the first base station 420 by using the common information (e.g., the broadcast information) obtained from the second base station 430. Alternatively, the terminal 410 may communicate with the first base station 420 after obtaining partial system information (e.g., additional system information, other system information) from the first base station 420.

The terminal 410 may transmit a random access preamble (RA MSG1) to the first base station 420 using the resources indicated by the common information obtained from the second base station (S420). As described later, the common information may include resource allocation information grouped according to the size of the identifier of the terminal.

The terminal 410 may indicate the length (e.g., size) of the identifier of the terminal 410 through the random access preamble (RA MSG1) by differently configure the transmission resource of the random access preamble (RA MSG1). The identifier of the terminal 410 may be a short ID allocated from the base station or the communication system. The short ID may include a Cell-Radio Network Temporary Identity (C-RNTI). When the terminal 410 is not assigned a short ID in advance, the identifier of the terminal 410 may be a long ID. The long ID may include at least one of a Temporary Mobile Station Identifier (S-TMSI) and an International Mobile Subscriber Identity (IMSI). The length of the identifier of the terminal 410 may vary depending on the type of the identifier type (e.g., short ID, long ID) of the terminal 410. The terminal 410 may transmit the random access preamble (RA MSG1) by using the radio resource allocated according to its identifier length.

As another example, the terminal 410 may be configured to transmit the random access preamble (RA MSG1) by using a different radio resource according to the connection state of the terminal 410 (e.g., RRC_IDLE state, RRC_CONNECTED state, or RRC_INACTIVE state). Accordingly, the terminal 410 may transmit the random access preamble (RA MSG1) using radio resources differently defined according to the length of its identifier (or, UE ID) or its connection state. The first base station 420 may receive the random access preamble (RA MSG1) from the terminal 410, and may identify the length of the identifier or the operation state of the terminal 410 based on the radio resources through which the random access preamble (RA MSG1) is received.

Meanwhile, the first base station 420 may transmit a random access response (RA MSG2) to the terminal 410 (S430). The random access response (RA MSG2) may include scheduling information for an uplink message (RA MSG3) of a step S440.

The scheduling information may include an identifier of the first base station 420, a beam index, an indicator for identifying the scheduling information, resource allocation information, modulation and coding scheme (MCS) information, resource allocation information for transmission of a feedback message (e.g., an acknowledgment (ACK) message or a negative ACK (HACK) message), and the like. The resource allocation information may include a parameter indicating a frequency resource, a parameter indicating a time resource, transmission and reception time related information (e.g., period, duration, window), and the like.

Meanwhile, a plurality of base stations may receive the random access preamble of the terminal 410, and in this case, each of the plurality of base stations may transmit the random access response to the terminal 410. Here, the random access response may include an identifier (e.g., a cell identifier) of each base station. When the random access responses are received from a plurality of base stations, the terminal 410 may select one base station satisfying a preconfigured condition among the plurality of base stations. Here, the preconfigured condition may be included in the random access response in the step S430. Alternatively, the terminal 410 may arbitrarily select one base station among the plurality of base stations. The terminal 410 may perform steps S440 and S450 with the selected base station.

When the downlink transmission request procedure is performed, the random access response of the step S430 may include essential system information (e.g., master information block (MIB)), scheduling information of system information (e.g., system information block 1 (SIB1)), configuration information of physical layer channels of the corresponding base station (e.g., SIB2), system information for a specific function (e.g., MBMS, D2D communications, machine type communication (MTC), IoT, vehicle communication (e.g., vehicle-to-everything (V2X)), alarms for disaster and social safety networks, transmission of location information and common time, interworking with other RAT systems, etc.), updated system information, and the like. Thus, the first base station 420 is required to able to identify the information requested by the terminal 410 through the random access preamble (or, random access payload) received from the terminal 410 in the step S420. For example, a mapping relationship between the transmission resources (e.g., preamble indexes in the random access procedure, specific uplink signal sequences (e.g., sequence, signature), values of a specific field of the random access payload) for the random access preamble (or, random access payload) of the terminal 410 and the requested downlink information may be configured, and the first base station 420 may identify the information (e.g., downlink information mapped to the transmission resource for the random access preamble (or, random access payload)) requested by the terminal 410.

When the random access response is received from the first base station 420, the terminal 410 may transmit an uplink message (RA MSG3) including the information of the terminal 410 to the first base station 420 (S440). The information of the terminal 410 may include an identifier, a capability, an attribute, a mobility state, a location, and the like. Also, the uplink message of the step S440 may be used to request necessary information.

The first base station 420 may receive the uplink message (RA MSG3) from the terminal 410 and identify the information included in the uplink message (RA MSG3). The first base station 420 may generate a downlink message (RA MSG4) and may transmit the generated downlink message (RA MSG4) to the terminal 410 (S450). The terminal 410 may receive the downlink message (RA MSG4) from the first base station 420, and identify the information included in the downlink message (RA MSG4). The step S450 may be performed selectively. That is, when there is no information to be transmitted through the downlink message (RA MSG4), the step S450 may be omitted.

In FIG. 4, a case in which the terminal 410 receives the common information from the second base station 430 other than the first base station 420 and performs the random access procedure with the first base station 420 using the received common information is shown. However, the embodiment is not limited thereto.

Figure 5:
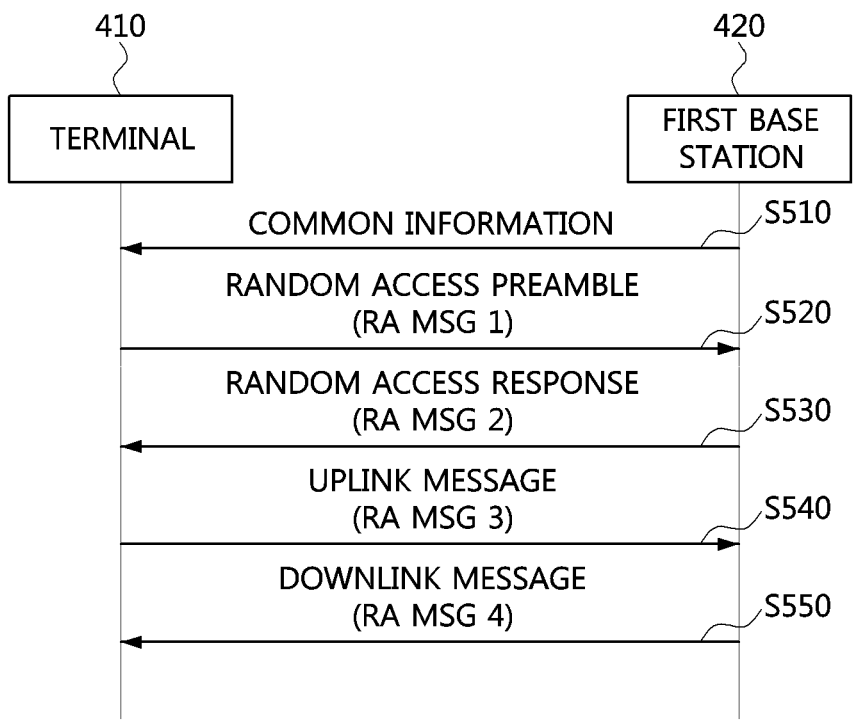
FIG. 5 is a sequence chart illustrating a second embodiment of a random access procedure in a communication system.

FIG. 5 is a sequence chart illustrating a second embodiment of a random access procedure in a communication system. In the following description of the embodiment of FIG. 5, the description overlapping with FIG. 4 is omitted.

Referring to FIG. 5, a communication system may include a terminal 410, a first base station 420, and the like. Each of the terminal 410 and the first base station 420 may be configured to be the same as or similar to the communication node 200 shown in FIG. 2. In a step S510, the terminal 410 may receive common information from the first base station 420. The terminal 410 may perform a random access procedure with the first base station 420 using the common information received from the first base station 420. For example, the terminal 410 may transmit a random access preamble (RA MSG1) to the first base station 420 by using a resource indicated by the common information (S520). The first base station 420 may receive the random access preamble (RA MSG1) from the terminal 410, identify information included in the random access preamble (RA MSG1), and transmit a random access response (RA MSG2) to the terminal 410 in response to the random access preamble (RA MSG1) (S530). The terminal 410 may receive the random access response (RA MSG2) from the first base station 420, and may identify information included in the random access response (RA MSG2).

The terminal 410 may then generate an uplink message (RA MSG3) and transmit the uplink message (RA MSG3) to the first base station 420 (S540). The first base station 420 may receive the uplink message (RA MSG3) from the terminal 410, and identify information included in the uplink message (RA MSG3). Further, the first base station 420 may generate a downlink message (RA MSG4) and transmit the downlink message (RA MSG4) to the terminal 410 (S550). The terminal 410 may receive the downlink message (RA MSG4) from the first base station 420, and identify information included in the downlink message (RA MSG4).

In FIGS. 4 and 5, the size of the uplink message (RA MSG3) transmitted by the terminal 410 may be variable. The uplink message (RA MSG3) may include at least one of the following information.

- Identifier (ID) of the terminal 410;
- Information such as capability, attribute, mobility state, or location of the terminal 410
- Radio access attempt reason
- Size of uplink data and/or uplink data (e.g., length indicator (LI))
- Uplink buffer size information (e.g., buffer status report (BSR))
- Control message for connection configuration request
- Radio channel measurement result The information included in the uplink message (RA MSG3) may include the capability of the terminal represented by at least one feature group indicator (FGI) in the LTE-based communication system. Also, the information included in the uplink message (RA MSG3) may further include information such as whether to apply a beamforming technique, the number of RF modules (or, chains), information of a frequency band that can be supported, whether or not vehicle communication is supported, and the like. Also, the mobility-related information (e.g., movement state, location information) of the terminal 410 may include not only movement speed information but also moving direction, altitude, position information using a positioning system such as GPS, relative position information according to a road or a trajectory, and the like.

The radio access attempt reason may be the downlink data transmission request such as the above-described system information transmission request according to an on-demand of the terminal 410, update of firmware or essential software of the terminal 410, and the like. The radio access attempt reason may include at least one of information that can distinguish a reason for performing the radio access procedure (e.g., random access procedure) described below.

Uplink resource allocation
Handover request or measurement result report
State transition (or change) of the terminal apparatus
Re-establishment of a radio channel
Beam sweeping for beamforming, beam reconfiguration, or beam change
Acquisition of physical channel synchronization
Location update report
Reporting of movement state or buffer status The 'uplink resource allocation' among the radio access attempt reasons may mean a resource allocation request for uplink transmission of the terminal 410. The uplink resource allocation request may include a transmission buffer status report (e.g., BSR) of the terminal 410, a resource allocation request for transmitting a message according to a reference value of a predefined message size, and the like. Here, the predefined message size may indicate the size of the message that the terminal 410 can transmit. The unit of message size may be expressed in bits, bytes, or the like. The reference value of the predefined message size may be set based on cell unit, capability of the terminal, service, and the like, and may be transmitted from the base station (e.g., the first base station 420 or the second base station 430) to the terminal 410 through system information or a dedicated control message. Alternatively, the reference value of the predefined message size may be preconfigured to a common value in the communication system (e.g., base station or terminal).

The resource allocation request for message transmission according to the reference value of the predefined message size may be classified into a resource allocation request for transmission of a message larger than the reference value and a resource allocation request for transmission of a message smaller than the reference value. That is, the terminal 410 may request resource allocation for transmission of a message larger than the reference value or resource allocation for transmission of a message smaller than the reference value.

The base station (e.g., the first base station 420, the second base station 430) may control the operation state of the terminal 410 based on the resource allocation request for transmission of the message according to the reference value of the predefined message size. For example, when a resource allocation request for transmitting a message smaller than the reference value is received from the terminal 410, the base station may control the terminal 410 to transmit the corresponding message in the RRC_INACTIVE state, and control the terminal to transition to the RRC_INACTIVE state or the RRC_IDLE state after transmitting the corresponding message. When a resource allocation request for transmission of a message larger than the reference value is received from the terminal 410, the base station may control the terminal 410 to transmit the corresponding message in the RRC_CONNECTED state or the RRC_INACTIVE state. Further, the base station may control the terminal 410 performing the random access procedure in a state other than the RRC_CONNECTED state or the RRC_INACTIVE state to perform communications (e.g., uplink transmission operations, downlink reception operations) with the base station after transitioning to the RRC_CONNECTED state or the RRC_INACTIVE state. Here, the base station may transmit a random access response message or a separate control message to the terminal 410, thereby instructing the terminal 410 to perform the operation state transition.

The radio channel measurement result may be information indicating a quality of a downlink radio channel measured by the terminal 410. For example, the radio channel quality information may be a received signal strength indicator (RSSI), a received signal code power (RSCP), a reference signal received power (RSRP), a reference signal received quality (RSRQ), or the like. When a beamforming scheme is applied to the base station (or cell) or the terminal, the radio channel measurement result may include a per-beam (or per beam group) measurement result for each of the transmission beam and the reception beam. As another example, the radio channel measurement result may include a result of a beam sweeping that the terminal 410 performs for the reception beam or the transmission beam or beam sweeping feedback information of the terminal 410 for the optimal beamforming at the base station.

In order to selectively include various information in the uplink message (RA MSG3), the terminal 410 may include at least one field indicating information related to a format of the uplink message in the uplink message. For example, the uplink message (RA MSG3) may include a first field indicating the size of the identifier of the terminal 410. As described above, the identifier of the terminal 410 may be a short ID (e.g., C-RNTI in the LTE based communication system) or a long ID (e.g., S-TMSI or IMSI in the LTE based communication system). The first base station 420 may identify the size of the identifier of the terminal 410 from the first field of the uplink message (RA MSG3). For example, the first base station 420 may identify whether the identifier of the terminal 410 is a short ID or a long ID from the first field of the uplink message (RA MSG3).

Figure 6:
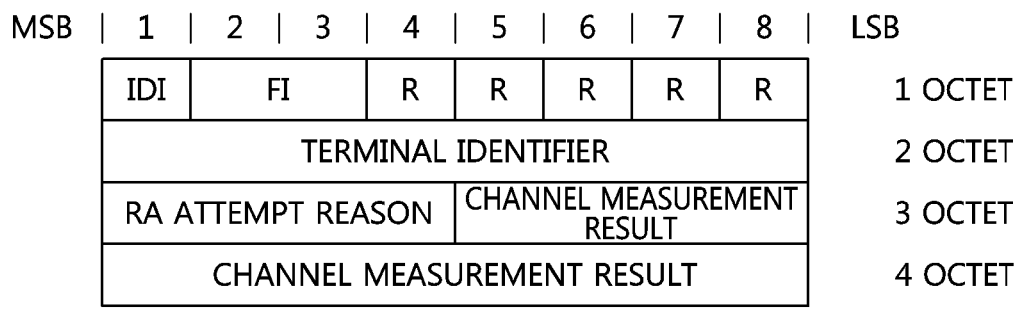
FIG. 6 is a conceptual diagram illustrating a first embodiment of an uplink message.

FIG. 6 is a conceptual diagram illustrating a first embodiment of an uplink message.

Referring to FIG. 6, the uplink message (RA MSG3) may include a first field (i.e., identifier indication (IDI)) representing the size of the identifier of the terminal 410, a format indicator field FI, a reserved field R, a terminal identifier field, an RA attempt reason field, and a channel measurement result field. Here, the size of the first field IDI may be 1 bit, the size of the FI field may be 2 bits, the size of the reserved field R may be 5 bits, the size of the terminal identifier field may be 8 bits, the size of the RA attempt reason field may be 4 bits, and the size of the channel measurement result field may be 12 bits.

When the terminal 410 distinguishes the identifier of the terminal 410 only by a short ID and a long ID, the size of the first field IDI may be 1 bit. For example, the terminal 410 may set the first field IDI to '0' when the identifier of the terminal 410 is a short ID. When the identifier of the terminal 410 is a long ID, the terminal 410 may set the first field IDI to '1'. As another example, the terminal 410 may set the first field IDI to '1' when the identifier of the terminal 410 is a short ID, and set the first field IDI to '0' when the identifier of the terminal 410 is a long ID.

When the number of cases of discriminating the size of the identifier of the terminal 410 is equal to or greater than 3, the terminal 410 may set the size of the first field IDI to two or more bits.

In FIG. 6, an example in which the size of the first field IDI is 1 bit is shown. Also, when the value of the first field IDI is set to '0', since the identifier of the terminal 410 is a short ID, the size of the terminal identifier field may be 8 bits.

Figure 7:
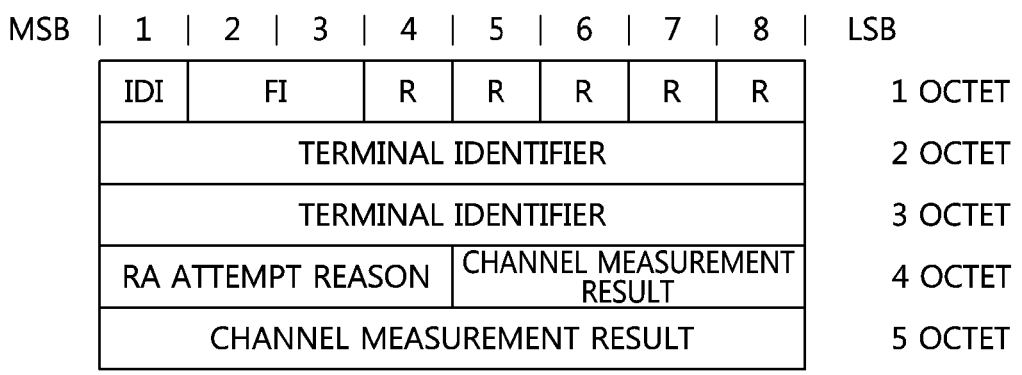
FIG. 7 is a conceptual diagram illustrating a second embodiment of an uplink message.

FIG. 7 is a conceptual diagram illustrating a second embodiment of an uplink message.

Referring to FIG. 7, the uplink message (RA MSG3) may include a first field IDI a FI field, a reserved field R, a terminal identifier field, an RA attempt reason field, and a channel measurement result field. Here, the size of the first field IDI may be 1 bit, the size of the FI field may be 2 bits, the size of the reserved field R may be 5 bits, the size of the terminal identifier field may be 16 bits, the size of the RA attempt reason field may be 4 bits, and the size of the channel measurement result field may be 12 bits.

The first field IDI in FIG. 7 may indicate that the identifier of the terminal 410 is a long ID. In this case, the size of the identifier of the terminal 410 may be 16 bits. The information shown in FIGS. 6 and 7 is merely exemplary, and the uplink message may include other information among the above-mentioned information.

Referring again to FIGS. 6 and 7, the FI field of the uplink message (RA MSG3) may indicate the type of information included in the uplink message (RA MSG3). For example, the FI field may include an indicator indicating the type and configuration of the information included in the uplink message (RA MSG3). In FIGS. 6 and 7, the case where the size of the FI field is 2 bits is shown. However, the embodiment is not limited thereto, and the size of the FI field may be smaller or larger than 2 bits. The size of the uplink message and the type of the information included in the uplink message may be changed according to values configured in the first field IDI and the FI field.

Figure 8:
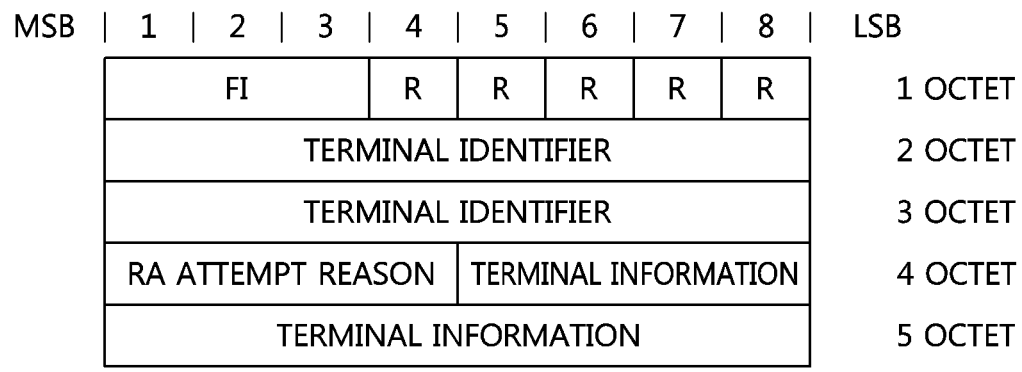
FIG. 8 is a conceptual diagram illustrating a third embodiment of an uplink message.

FIG. 8 is a conceptual diagram illustrating a third embodiment of an uplink message.

Referring to FIG. 8, the uplink message (RA MSG3) may include a terminal identifier field, a FI field, a reserved field R, an RA attempt reason field, and a terminal information field. Here, the uplink message (RA MSG3) may not include the first field IDI. In this case, the terminal 410 may use radio resources (e.g., radio resources allocated according to the size of the identifier of the terminal 410) allocated based on the common information obtained in the step S410 to transmit the random access preamble (RA MSG1) in the step S420. For example, the terminal 410 may transmit the random access preamble (RA MSG1) using different radio resources for each of a short ID of the terminal 410 and a long ID of the terminal 410. In the step S420, the first base station 420 may determine the size of the identifier (e.g., short ID or long ID) of the terminal 410 based on the radio resources used for the transmission of the random access preamble (RA MSG1). Therefore, in this case, the first field IDI may be omitted in the uplink message (RA MSG3).

Meanwhile, the size of the FI field may be 3 bits. The information included in the uplink message (RA MSG3), the size of the uplink message (RA MSG3), and the like may be changed according to the value of the FI field. The uplink message (RA MSG3) may be configured according to the value of the FI field as shown in Table 1 below.

TABLE 1

| FI field | Information included in the uplink message (RA MSG3) |
|---|---|
| 000 | Terminal identifier, RA attempt reason, terminal information (capability, attribute, mobility state, location information, etc.) |
| 001 | Terminal identifier, RA attempt reason, terminal information (capability, attribute, mobility state, location information, etc.), radio channel measurement result |
| 010 | Terminal identifier, packet data, size of uplink data (LI), uplink BSR |
| 011 | Terminal identifier, control message for connection configuration request, uplink BSR |
| 100 | RA attempt reason, terminal information (capability, attribute, mobility state, location information, etc.) |

TABLE 1-continued

| FI field | Information included in the uplink message (RA MSG3) |
|---|---|
| 101 | RA attempt reason, terminal information (capability, attribute, mobility state, location information, etc.), radio channel measurement result |
| 110 | Packet data, size of uplink data (LI), uplink BSR |
| 111 | Control message for connection configuration request, uplink BSR |

Referring to Table 1, the information included in the uplink message (RA MSG3) may vary depending on the value of the FI field. For example, the terminal 410 may determine the information included in the uplink message (RA MSG3) and determine the value of the FI field. The first base station 420 may identify the FI field of the uplink message (RA MSG3) received from the terminal 410 to determine the type of the information included in the uplink message (RA MSG3) and the configuration of the uplink message (RA MSG3). Table 1 is merely an example, and the type of information matched to the value of the FI field may vary. In accordance with Table 1, the uplink message (RA MSG3) shown in FIG. 8 may correspond to a case where the value of the FI field is '000'. In FIG. 8, the FI field is placed at the front of the uplink message (RA MSG3), but the embodiment is not limited thereto.

Figure 9:
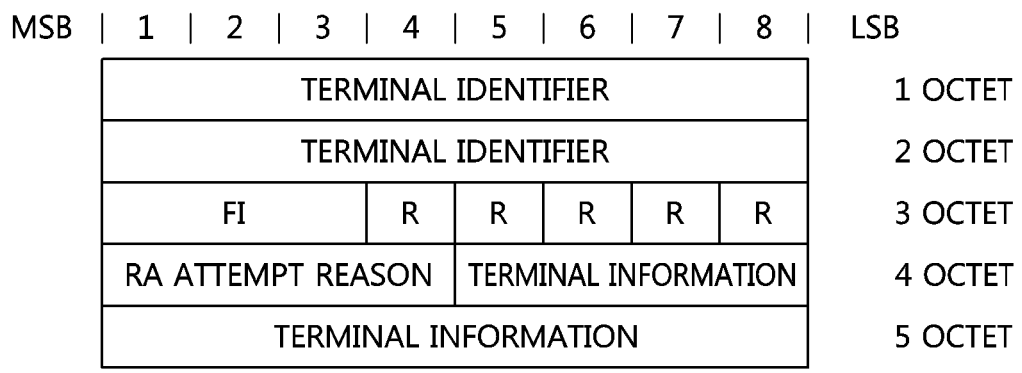
FIG. 9 is a conceptual diagram illustrating a fourth embodiment of an uplink message.

FIG. 9 is a conceptual diagram illustrating a fourth embodiment of an uplink message.

Referring to FIG. 9, the uplink message (RA MSG3) may include a terminal identifier field, a FI field, a reserved field, an RA attempt reason field, and a terminal information field. In this case, the first base station 420 may determine the size of the identifier of the terminal 410 by identifying the radio resources used for transmission of the random access preamble (RA MSG1) of the terminal 410. For example, the first base station 420 may determine that the size of the identifier of the terminal 410 is 16 bits based on the radio resources used for transmission of the random access preamble (RA MSG1). Also, the first base station 420 may determine that the RA attempt reason field and the terminal information field are included in the uplink message (RA MSG3) by checking the FI field.

Meanwhile, in FIGS. 6 and 7, an example in which the first field IDI and the FI field are divided as different fields is shown. However, the embodiment is not limited thereto. For example, the terminal 410 may include the first field IDI in the FI field to represent them with one field. That is, the uplink message (RA MSG3) may include a FI-1 field including the value of the first field IDI and the value of the FI field. The FI-1 field may be configured as follows.

Figure 10:
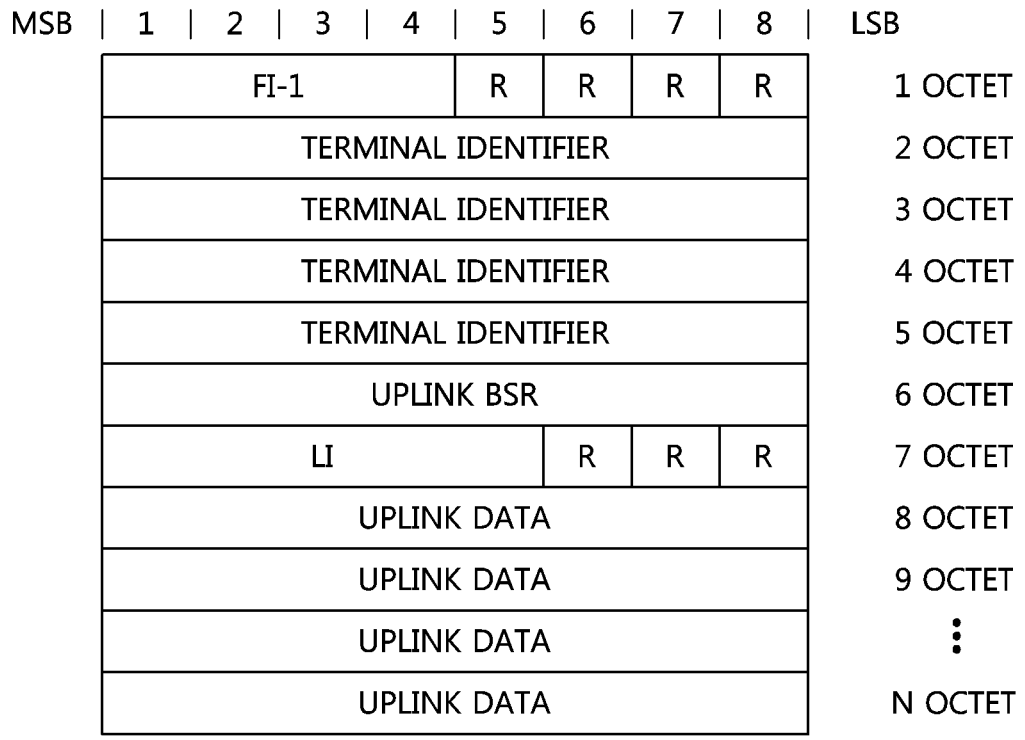
FIG. 10 is a conceptual diagram illustrating a fifth embodiment of an uplink message.

FIG. 10 is a conceptual diagram illustrating a fifth embodiment of an uplink message.

Referring to FIG. 10, the uplink message (RA MSG3) may include a FI-1 field, a reserved field R, a terminal identifier field, an uplink BSR field, a LI field, and an uplink data field. One bit of the FI-1 field may indicate the size of the identifier of the terminal 410, and the remaining 3 bits of the FI-1 field may indicate the type of information included in the uplink message (RA MSG3). That is, the FI-1 field may be a combination of the first field IDI and the FI field shown in FIGS. 6 to 9. For example, in the case that the identifier of the terminal 410 is classified into a short ID and a long ID, when the first bit value of the FI-1 field is '1', the identifier of the terminal 410 may be a short ID, and when the value of the first bit of the first field is '0', the identifier of the terminal 410 may be a long ID. Also, when the number of cases for the identifier size of the terminal 410 is equal to or greater than 3, the terminal 410 may indicate the size of the identifier by using 2 or more bits in the FI-1 field.

The uplink message (RA MSG3) may be configured according to the value of the FI-1 field as shown in Table 2 below. Here, one bit of the FI-1 field may indicate the size of the identifier of the terminal 410, and the remaining 3 bits of the FI-1 field may indicate the type of information included in the uplink message (RA MSG3).

TABLE 2

| FI-1 field | Information included in the uplink message (RA MSG3) |
|---|---|
| 0000 | Terminal identifier (short ID), RA attempt reason, terminal information (capability, attribute, mobility state, location information, etc.) |
| 0001 | Terminal identifier (short ID), RA attempt reason, terminal information (capability, attribute, mobility state, location information, etc.), radio channel measurement result |
| 0010 | Terminal identifier (short ID), packet data, size of uplink data (LI), uplink BSR |
| 0011 | Terminal identifier (short ID), control message for connection configuration request, uplink BSR |
| 0100 | Terminal identifier (short ID), RA attempt reason, terminal information (capability, attribute, mobility state, location information, etc.) |
| 0101 | Terminal identifier (short ID), RA attempt reason, terminal information (capability, attribute, mobility state, location information, etc.), radio channel measurement result |
| 0110 | Terminal identifier (short ID), packet data, size of uplink data (LI), uplink BSR |
| 0111 | Terminal identifier (short ID), control message for connection configuration request, uplink BSR |
| 1000 | Terminal identifier (long ID), RA attempt reason, terminal information (capability, attribute, mobility state, location information, etc.) |
| 1001 | Terminal identifier (long ID), RA attempt reason, terminal information (capability, attribute, mobility state, location information, etc.), radio channel measurement result |
| 1010 | Terminal identifier (long ID), packet data, size of uplink data (LI), uplink BSR |
| 1011 | Terminal identifier (long ID), control message for connection configuration request, uplink BSR |
| 1100~1111 | Reserved |

Referring to Table 2, the size of the identifier of the terminal 410 and the information included in the uplink message may vary according to the value of the FI-1 field. The terminal 410 may determine the information included in the uplink message and determine the value of the FI-1 field. The first base station 420 may determine the size of the identifier of the terminal 410, the type of the information included in the uplink message, and the configuration of the uplink message by checking the FI-1 field of the uplink message received from the terminal 410. Table 2 is exemplary only, and the type of the information and the size of the identifier of the terminal 410 matched to the value of the FI-1 field and may vary. In accordance with Table 2, the uplink message (RA MSG3) shown in FIG. 10 may correspond to a case where the value of the FI-1 field is '0110'.

Referring again to FIG. 10, when the FI-1 field is set to '0110', the uplink message (RA MSG3) may include a 32-bit terminal identifier field, an uplink BSR field, a length indicator field LI. The LI field may indicate the size of the uplink data included in the uplink message (RA MSG3). The terminal 410 may set the value of the LI field differently according to the size of the uplink data to be transmitted to the first base station 420. The first base station 420 may determine the size of the uplink data by checking the LI field in the uplink message (RA MSG3) received from the terminal 410. In FIG. 10, a case where the LI field is represented by 5 bits is shown, but the embodiment is not limited thereto. For example, the LI field may be represented by bits less than or greater than 5 bits.

Figure 11:
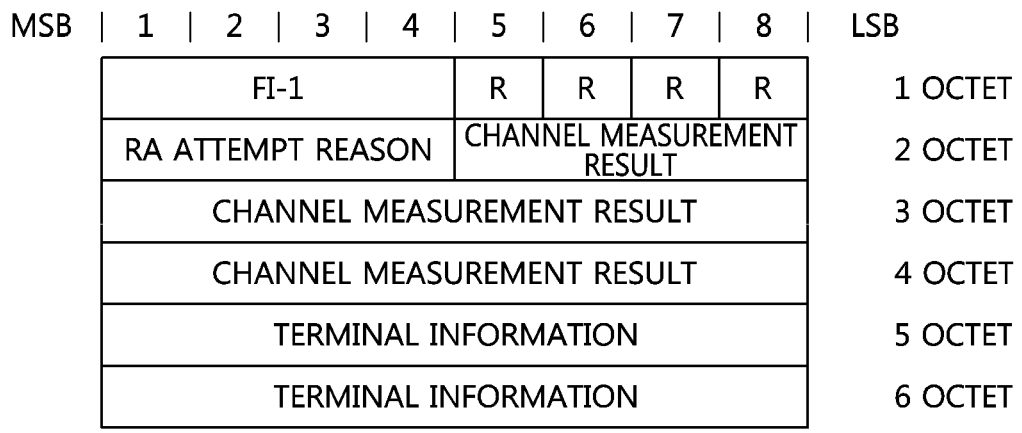
FIG. 11 is a conceptual diagram illustrating a sixth embodiment of an uplink message.

FIG. 11 is a conceptual diagram illustrating a sixth embodiment of an uplink message.

Referring to FIG. 11, when the value of the FI-1 field of the uplink message (RA MSG3) is set to '1001', the uplink message (RA MSG3) may include a FI-1 field, a reserved field R, an RA attempt reason field, a channel measurement result field, and a terminal information field. The size of the RA attempt reason field may be 4 bits. The size of the channel measurement result field may be 20 bits, and the channel measurement result field may include the result of beam sweeping. The size of the terminal information field may be 16 bits, and the terminal information field may include capability, attribute, mobility state, location information, and the like.

In the description with reference to FIGS. 6 to 11, the uplink message (RA MSG3) may include the field (e.g., FI field or FI-1 field) indicating the type of the information included in the uplink message (RA MSG3). However, the embodiment is not limited thereto. The information included in the uplink message (RA MSG3) may be determined by the first base station 420 instead of the terminal 410, and the first base station 420 may inform the information included in the uplink message (RA MSG3) to the terminal 410. In this case, since the terminal 410 configures the uplink message (RA MSG3) according to the indication of the first base station 420, the field (e.g., FI field or FI-1 field) indicating the information included in the uplink message (RA MSG3) may be omitted.

For example, in the step S430 of FIG. 4, the first base station 420 may include the configuration of the uplink message (RA MSG3), the information included in the uplink message (RA MSG3), the size information of the uplink message (RA MSG3), and the like in the random access response (RA MSG2). The first base station 420 may include the value of the FI field described with reference to Table 1 in the random access response (RA MSG2). As another example, the first base station 420 may include the value of the FI-1 field described with reference to Table 2 in the random access response (RA MSG2). The first base station 420 may include a field value indicating the size of the uplink message (RA MSG3) in the random access response (RA MSG2).

In the step S430, the terminal 410 may identify at least one of the FI field, the FI-1 field, and the field indicating the size of the uplink message included in the random access response (RA MSG2) received from the first base station 420, and may configure the uplink message (RA MSG3) according to the indication (e.g., the information in the identified fields) of the first base station 420. In this case, since the first base station 420 already knows the configuration of the uplink message (RA MSG3) and the information included in the uplink message (RA MSG3), the FI field or the FI-1 field described above may be omitted.

Alternatively, even when the first base station 420 transmits the random access response (RA MSG2) including the configuration of the uplink message (RA MSG3), the information included in the uplink message (RA MSG3), the size information of the uplink message (RA MSG3), the scheduling information of the uplink message (RA MSG3), and the like, the terminal 410 may transmit the uplink message (RA MSG3) including the FI field or the FI-1 field.

Meanwhile, the uplink message (RA MSG3) may be divided into a terminal identifier field and a payload. The payload of the uplink message (RA MSG3) may include information indicated by fields other than the terminal identifier field. When the first base station 420 transmits the random access response (RA MSG2) including the configuration of the uplink message (RA MSG3), the information included in the payload of the uplink message (RA MSG3), the size information of the payload of the uplink message (RA MSG3), and the like, the payload may not include information indicating the format of the payload.

Depending on the size of the payload, the type of information included in the payload and the configuration of the payload may be preconfigured. For example, the type of information included in the payload, the arrangement order of the information, the format of the message indicating each information, and the like may be preconfigured according to the size of the payload. In this case, the first base station 420 may inform the terminal 410 of the size of the payload through the random access response (RA MSG2). The terminal 410 may identify the size of the payload from the random access response (RA MSG2), and may include information corresponding to the size of the payload in the payload. The terminal 410 may generate the uplink message (RA MSG3) based on the format corresponding to the size of the payload.

Figure 12:
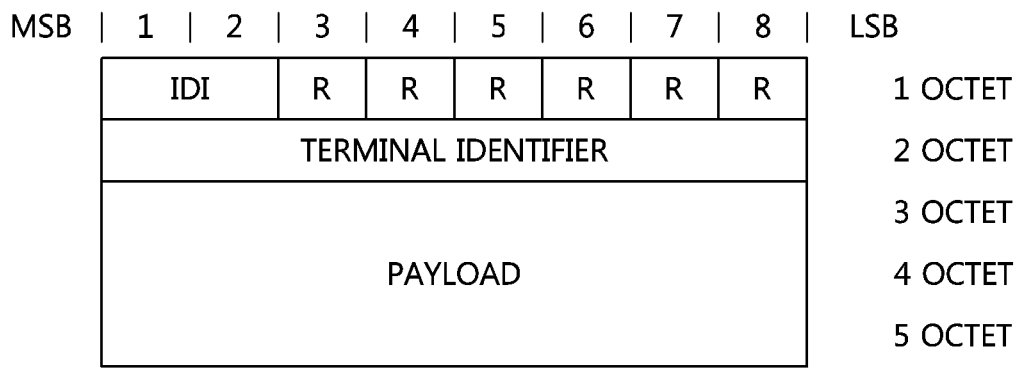
FIG. 12 is a conceptual diagram illustrating a seventh embodiment of an uplink message.

FIG. 12 is a conceptual diagram illustrating a seventh embodiment of an uplink message.

Referring to FIG. 12, the uplink message (RA MSG3) may include an IDI field, a reserved field R, a terminal identifier field, and a payload. The IDI field may indicate that the identifier of the terminal 410 is a short ID, and in this case, the size of the terminal identifier field may be 8 bits. The size of the payload may be 24 bits, and the information included in the payload having the size of 24 bits may be predefined. Since the terminal 410 configures the payload based on the format corresponding to the size of the payload indicated by the first base station 420, the field indicating the information included in the payload may be omitted in the uplink message (RA MSG3).

Figure 13:
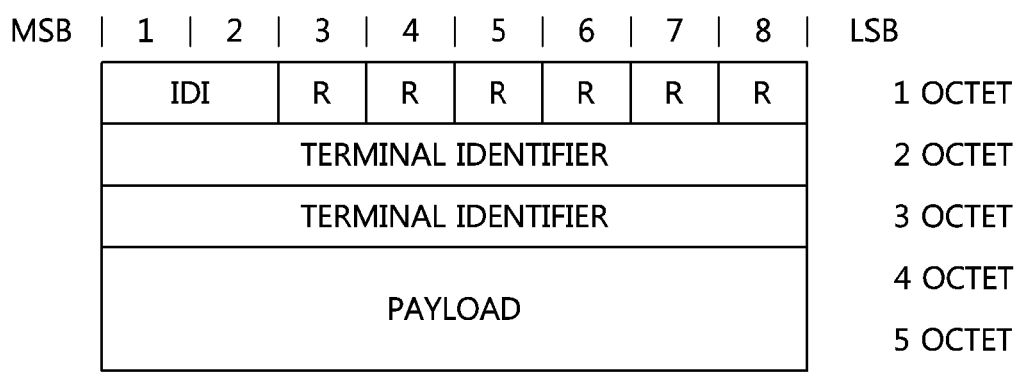
FIG. 13 is a conceptual diagram illustrating an eighth embodiment of an uplink message.

FIG. 13 is a conceptual diagram illustrating an eighth embodiment of an uplink message.

Referring to FIG. 13, the uplink message (RA MSG3) may include an IDI field, a reserved field R, a terminal identifier field, and a payload. The IDI field may indicate that the identifier of the terminal 410 is a medium ID, and in this case, the size of the terminal identifier field may be 16 bits. The size of the payload may be 16 bits, and the information included in the payload having the size of 16 bits may be predefined. Since the terminal 410 configures the payload based on the format corresponding to the size of the payload indicated by the first base station 420, the field indicating the information included in the payload may be omitted in the uplink message (RA MSG3).

Figure 14:
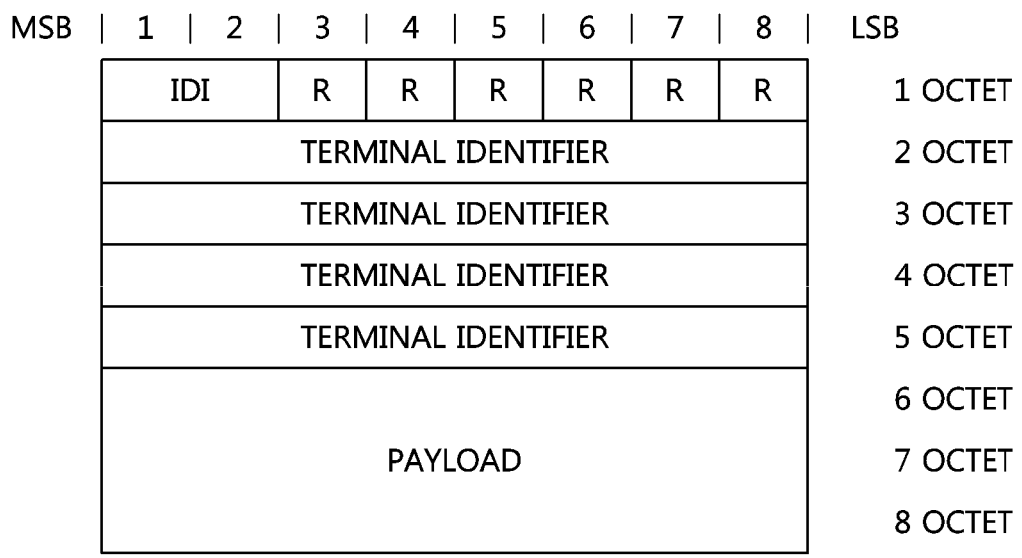
FIG. 14 is a conceptual diagram illustrating a ninth embodiment of an uplink message.

FIG. 14 is a conceptual diagram illustrating a ninth embodiment of an uplink message.

Referring to FIG. 14, the uplink message (RA MSG3) may include an IDI field, a reserved field R, a terminal identifier field, and a payload. The IDI field may indicate that the identifier of the terminal 410 is a long ID, and in this case, the size of the terminal identifier field may be 32 bits. The size of the payload may be 24 bits, and the information included in the payload having the size of 24 bits may be predefined. Since the terminal 410 configures the payload based on the format corresponding to the size of the payload indicated by the first base station 420, the field indicating the information included in the payload may be omitted in the uplink message (RA MSG3).

In the above-described embodiment, the first base station 420 may inform the terminal 410 of the size of the payload, and the terminal 410 may generate the uplink message (RA MSG3) in the format defined according to the size of the payload. As another example, the terminal 410 may determine the information to be included in the payload, and determine the format of the payload to include the determined information. In this case, the first base station 420 may transmit the random access response (RA MSG2) including the scheduling information for the uplink message (RA MSG3).

The terminal 410 may identify the scheduling information from the random access response (RA MSG2). The terminal 410 may calculate the size of a transmittable uplink message (RA MSG3) considering a modulation and demodulation scheme and the size of the allocated uplink radio resources according to the scheduling information. The terminal 410 may determine the size of the payload in the uplink message (RA MSG3) in consideration of the size of the transmittable uplink message (RA MSG3) and the information to be included in the uplink message (RA MSG3). The terminal 410 may generate the uplink message (RA MSG3) in the format corresponding to the determined size of the payload. The terminal 410 may include the information determined according to the payload size in the payload. The terminal 410 may include the field indicating the size of the payload in the uplink message (RA MSG3).

Figure 15:
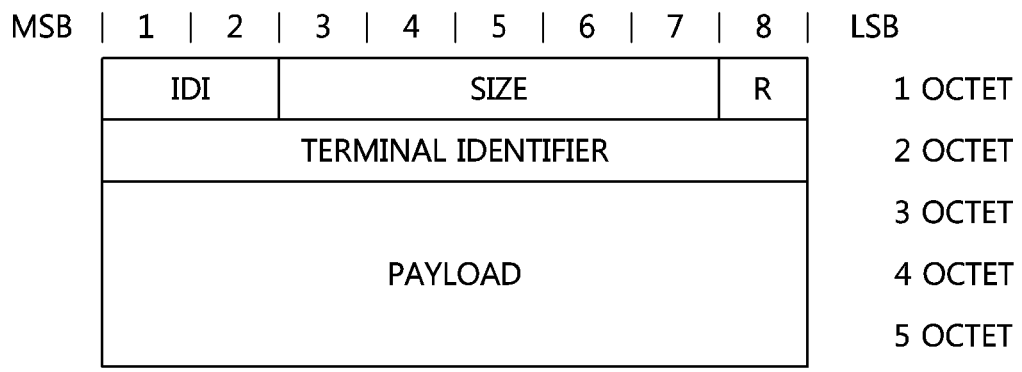
FIG. 15 is a conceptual diagram illustrating a tenth embodiment of an uplink message.

FIG. 15 is a conceptual diagram illustrating a tenth embodiment of an uplink message.

Referring to FIG. 15, the uplink message (RA MSG3) may include an IDI field, a size field, a reserved field R, a terminal identifier field, and a payload. The IDI field may indicate that the identifier of the terminal 410 is a short ID. In this case, the size of the terminal identifier field may be 8 bits. The size field may indicate the size of the payload, and may have a size of 5 bits. For example, the size field may indicate that the size of the payload is 24 bits. The terminal 410 may configure the payload based on a predefined format corresponding to 24 bits, and may transmit the uplink message (RA MSG3) including the payload to the first base station 420. The first base station 420 may receive the uplink message (RA MSG3) from the terminal 410, identify the size of the payload based on the size field of the uplink message (RA MSG3), and identify the payload configuration based on the identified size of the payload.

Figure 16:
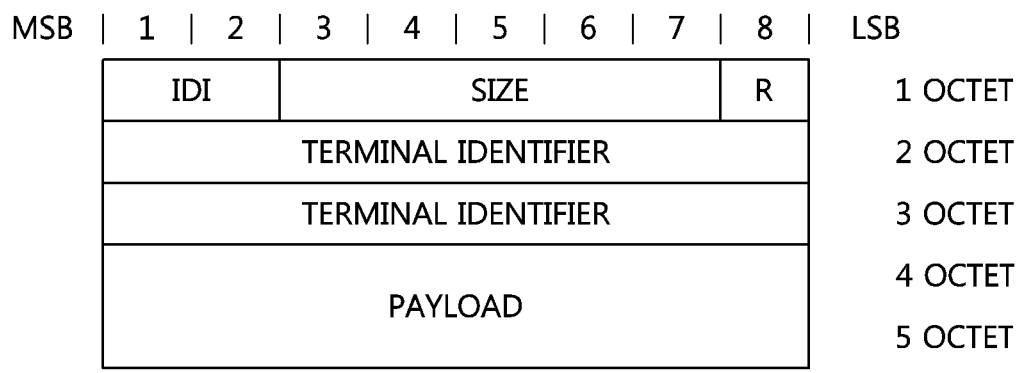
FIG. 16 is a conceptual diagram illustrating an eleventh embodiment of an uplink message.

FIG. 16 is a conceptual diagram illustrating an eleventh embodiment of an uplink message.

Referring to FIG. 16, the uplink message (RA MSG3) may include an IDI field, a size field, a reserved field R, a terminal identifier field, and a payload. The IDI field may indicate that the identifier of the terminal 410 is a medium ID. In this case, the size of the terminal identifier field may be 16 bits. The size field may indicate the size of the payload, and may have a size of 5 bits. For example, the size field may indicate that the size of the payload is 16 bits. The terminal 410 may configure the payload based on a predefined format corresponding to 16 bits, and may transmit the uplink message (RA MSG3) including the payload to the first base station 420. The first base station 420 may receive the uplink message (RA MSG3) from the terminal 410, identify the size of the payload based on the size field of the uplink message (RA MSG3), and identify the payload configuration based on the identified size of the payload.

Figure 17:
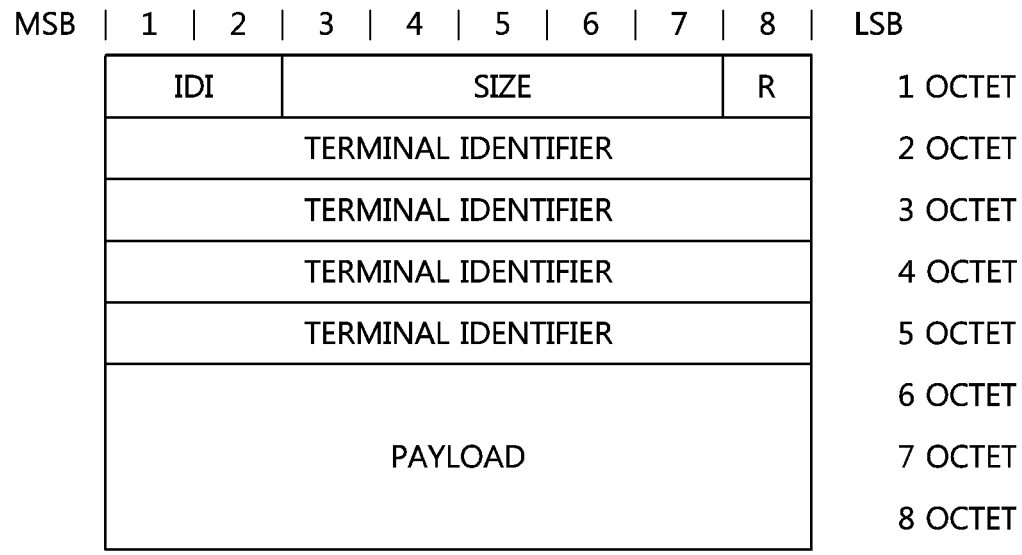
FIG. 17 is a conceptual diagram illustrating a twelfth embodiment of an uplink message.

FIG. 17 is a conceptual diagram illustrating a twelfth embodiment of an uplink message.

Referring to FIG. 17, the uplink message (RA MSG3) may include an IDI field, a size field, a reserved field R, a terminal identifier field, and a payload. The IDI field may indicate that the identifier of the terminal 410 is a long ID. In this case, the size of the terminal identifier field may be 32 bits. The size field may indicate the size of the payload, and may have a size of 5 bits. For example, the size field may indicate that the size of the payload is 24 bits. The terminal 410 may configure the payload based on a predefined format corresponding to 24 bits, and may transmit the uplink message (RA MSG3) including the payload to the first base station 420. The first base station 420 may receive the uplink message (RA MSG3) from the terminal 410, identify the size of the payload based on the size field of the uplink message (RA MSG3), and identify the payload configuration based on the identified size of the payload.

Figure 18:
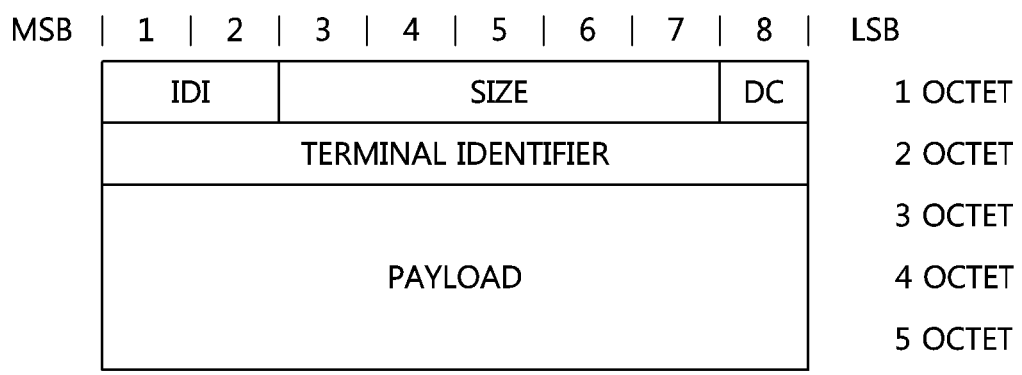
FIG. 18 is a conceptual diagram illustrating a thirteenth embodiment of an uplink message.

FIG. 18 is a conceptual diagram illustrating a thirteenth embodiment of an uplink message.

Referring to FIG. 18, the uplink message (RA MSG3) may include an IDI field, a size field, a DC field, a terminal identifier field, and a payload. The IDI field may indicate that the identifier of the terminal 410 is a short ID. In this case, the size of the terminal identifier field may be 8 bits. The size field may indicate the size of the payload, and may have a size of 5 bits. For example, the size field may indicate that the size of the payload is 24 bits. The DC field may indicate the type of information (e.g., data, control signaling information) included in the payload. For example, the DC field set to '0' may indicate that control signaling information is included in the payload, and the DC field set to '1' may indicate that data is included in the payload.

The terminal 410 may configure the payload based on the values indicated by the size field and the DC field, and may transmit the uplink message (RA MSG3) including the payload to the first base station 420. The first base station 420 may receive the uplink message (RA MSG3) from the terminal 410, identify the size of the payload based on the size field of the uplink message (RA MSG3), and identify the information included in the payload based on the DC field of the uplink message (RA MSG3).

Figure 19:
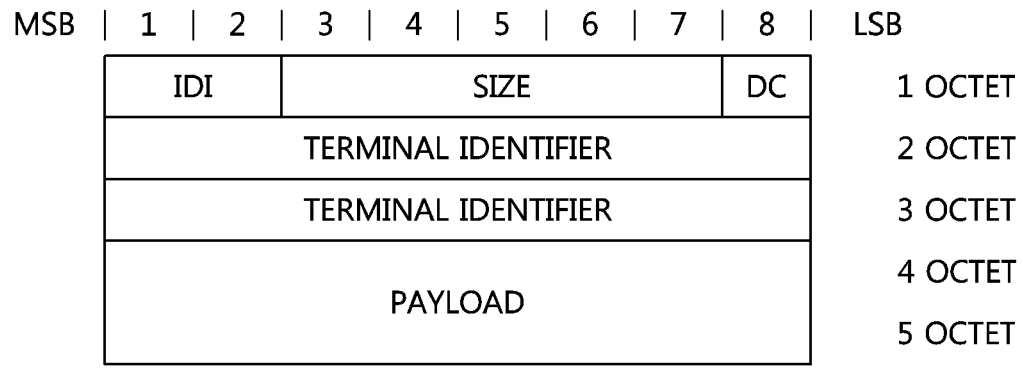
FIG. 19 is a conceptual diagram illustrating a fourteenth embodiment of an uplink message.

FIG. 19 is a conceptual diagram illustrating a fourteenth embodiment of an uplink message.

Referring to FIG. 19, the uplink message (RA MSG3) may include an IDI field, a size field, a DC field, a terminal identifier field, and a payload. The IDI field may indicate that the identifier of the terminal 410 is a medium ID. In this case, the size of the terminal identifier field may be 16 bits. The size field may indicate the size of the payload, and may have a size of 5 bits. For example, the size field may indicate that the size of the payload is 16 bits. The DC field may indicate the type of information (e.g., data, control signaling information) included in the payload. For example, the DC field set to '0' may indicate that control signaling information is included in the payload, and the DC field set to '1' may indicate that data is included in the payload.

The terminal 410 may configure the payload based on the values indicated by the size field and the DC field, and may transmit the uplink message (RA MSG3) including the payload to the first base station 420. The first base station 420 may receive the uplink message (RA MSG3) from the terminal 410, identify the size of the payload based on the size field of the uplink message (RA MSG3), and identify the information included in the payload based on the DC field of the uplink message (RA MSG3).

Figure 20:
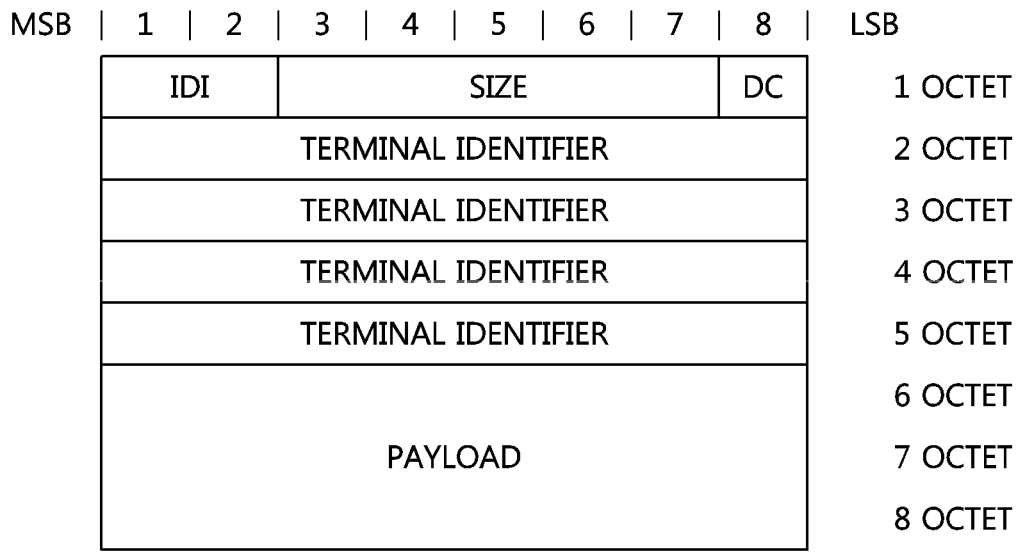
FIG. 20 is a conceptual diagram illustrating a fifteenth embodiment of an uplink message.

FIG. 20 is a conceptual diagram illustrating a fifteenth embodiment of an uplink message.

Referring to FIG. 20, the uplink message (RA MSG3) may include an IDI field, a size field, a DC field, a terminal identifier field, and a payload. The IDI field may indicate that the identifier of the terminal 410 is a long ID. In this case, the size of the terminal identifier field may be 32 bits. The size field may indicate the size of the payload, and may have a size of 5 bits. For example, the size field may indicate that the size of the payload is 24 bits. The DC field may indicate the type of information (e.g., data, control signaling information) included in the payload. For example, the DC field set to '0' may indicate that control signaling information is included in the payload, and the DC field set to '1' may indicate that data is included in the payload.

The terminal 410 may configure the payload based on the values indicated by the size field and the DC field, and may transmit the uplink message (RA MSG3) including the payload to the first base station 420. The first base station 420 may receive the uplink message (RA MSG3) from the terminal 410, identify the size of the payload based on the size field of the uplink message (RA MSG3), and identify the information included in the payload based on the DC field of the uplink message (RA MSG3).

The arrangement order of the fields in the uplink message (RA MSG3) shown in FIGS. 18 to 20 may be 'IDI field→size field→DC field'. However, the embodiment is not limited thereto. For example, the arrangement order of the fields in the uplink message (RA MSG3) may be 'DC field→IDI field→size field'. As another example, the arrangement order of the fields in the uplink message (RA MSG3) may be 'IDI field→DC field→size field'. As another example, the arrangement order of the fields in the uplink message (RA MSG3) may be 'DC field→size field→IDI field'. The arrangement order of the fields in the uplink message (RA MSG3) may be variously changed in consideration of byte alignment, processing, and the like.

Further, differently from the embodiments shown in FIGS. 18 to 20, the DC field may be expressed with two or more bits. When the DC field is represented by a plurality of bits, the terminal 410 may use the DC field to indicate in detail the type of the information included in the payload. For example, the terminal 410 may use the DC field to separately indicate data and control signaling information according to a protocol layer (e.g., physical layer, RRC layer, RLC layer, MAC layer, higher layer (e.g., Non-Access Stratum (NAS)), and the like). As another example, the terminal 410 may indicate objective, cause, form, or type of each of the data and control signaling information by using the DC field.

On the other hand, the random access procedure shown in FIGS. 4 and 5 may be further simplified in some cases.

Figure 21:
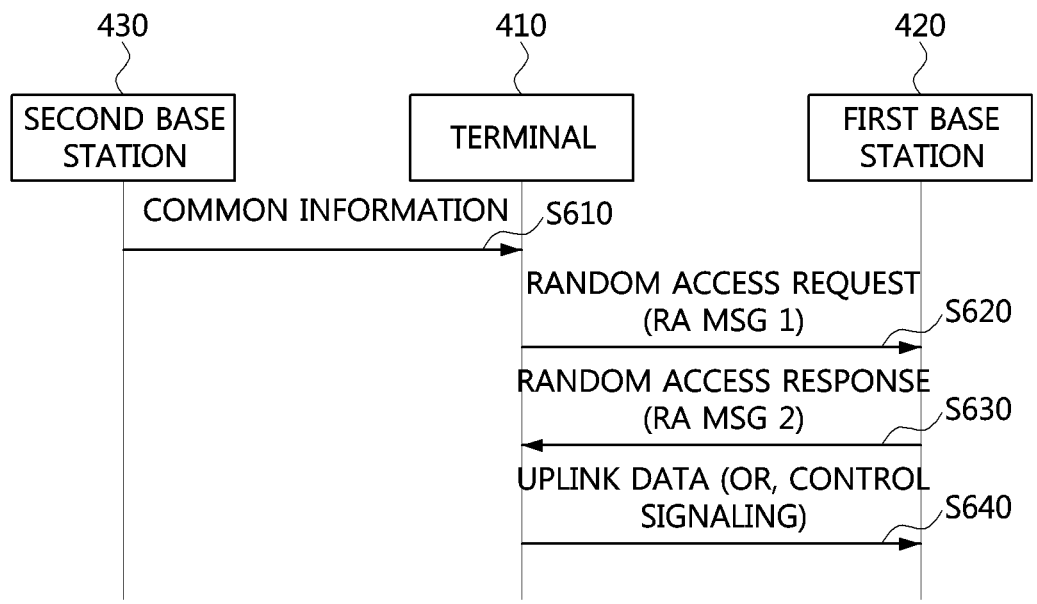
FIG. 21 is a sequence chart illustrating a third embodiment of a random access procedure in a communication system.

FIG. 21 is a sequence chart illustrating a third embodiment of a random access procedure in a communication system.

Referring to FIG. 21, the four steps corresponding to the steps S420 to S450 of FIG. 4 may be simplified into two steps. In a step S610, the terminal 410 may receive common information from the second base station 430. The common information may be configured identically in a plurality of base stations. The common information may include allocation information of radio resources used to transmit a random access request message (RA MSG1) to be described later. The terminal 410 may transmit the random access request message (RA MSG1) using the allocated radio resources.

The common information may include allocation information of radio resources grouped according to the length of the identifier of the terminal. The terminal 410 may identify the allocation information of the radio resources in the common information. The terminal 410 may transmit the random access request message (RA MSG1) which will be described later by using the radio resources corresponding to the length of the identifier of the terminal 410.

In a step S620, the terminal may transmit the random access request message (RA MSG1) using the radio resources identified in the common information. When the terminal 410 fails to obtain the allocation information of the radio resources, the terminal 410 may perform the step S610 again before performing the step S620 to obtain the allocation information of the radio resources.

The random access request message (RA MSG1) may include the random access preamble transmitted by the terminal 410 in the step S420 of FIG. 4 and the information of the uplink message transmitted by the terminal 410 in the step S440 of FIG. 4. The random access request message (RA MSG1) may include a random access preamble and a random access payload. The random access payload may include the identifier of the terminal 410, uplink data, control signaling information, and the like. In addition, the random access payload may include information that can be included in the uplink message of FIG. 4 described above.

The radio resources for transmission of the random access preamble and the radio resources for transmission of the random access payload may be separated from each other. The terminal 410 may transmit the random access preamble and the random access payload using different radio resources. The radio resources for the random access preamble and the radio resources for the random access payload may be configured or allocated in different schemes, or may be divided into different physical layer channels. The radio resources for the random access preamble and the radio resources for the random access payload may have different locations in the frequency-time space. An index transmission timing, an offset, and the like of the random access preamble for each of the radio resources for the random access preamble and the radio resources for the random access payload may be configured.

As an example, first radio resources for transmission of the random access payload may rely on second radio resources for transmission of the random access preamble. That is, although the first radio resources and the second radio resources are separated from each other, the first radio resources and the second radio resources may be in a mapping relationship with each other. For example, the first radio resources and the second radio resources may be consecutive in the time axis or may be allocated within a predetermined time window. As another example, a parameter for allocating the first radio resources and a parameter for allocating the second radio resources may be configured to have a predetermined offset in the frequency axis or the time axis.

The first base station 420 may receive the random access request message (RA MSG1) including the identifier of the terminal 410, uplink data (or, control signaling information), and the like from the terminal 410. In a step S630, the first base station 420 may transmit a random access response message (RA MSG2) in response to the random access request message (RA MGS1). The first base station 420 may include the identifier of the terminal 410 received through the random access payload of the step S620 in the random access response message (RA MSG2). The terminal 410 may receive the random access response message (RA MSG2). When the terminal 410 receives the random access response message (RA MSG2), the random access procedure simplified into the two steps may be terminated.

In a step S640, the terminal 410 may then transmit uplink data (or, control signaling information) using the uplink scheduling information received from the first base station 420.

Figure 22:
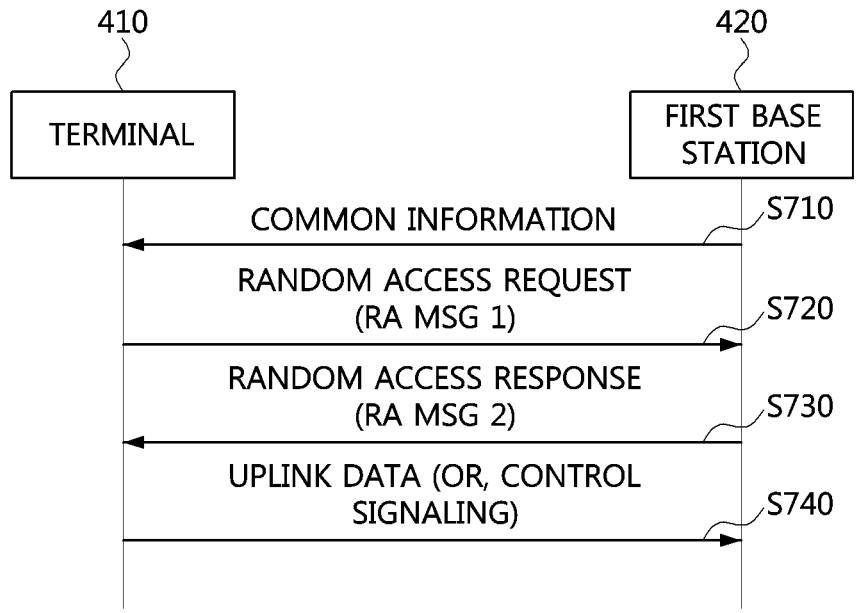
FIG. 22 is a sequence chart illustrating a fourth embodiment of a random access procedure in a communication system.

FIG. 22 is a sequence chart illustrating a fourth embodiment of a random access procedure in a communication system. In the following description of the embodiment of FIG. 22, the description overlapping with FIG. 21 is omitted.

Referring to FIG. 22, in a step S710, the terminal 410 may receive common information from the first base station 420. The terminal 410 may perform a random access procedure with the first base station 420 using the common information received from the first base station 420. For example, the terminal 410 may generate a random access request message (RA MSG1) and may transmit the generated random access request message (RA MSG1) to the first base station 420 (S720). The information included in the random access request message (RA MSG1) may be the same as or similar to the information included in the random access request message (RA MSG1) of FIG. 21. The first base station 420 may receive the random access request message (RA MSG1) from the terminal 410, identify the information included in the random access request message (RA MSG1), and transmit a random access response message (RA MSG2) to the terminal 410 in response to the random access request message (RA MSG1) (S730). The information included in the random access response message (RA MSG2) may be the same as or similar to the information included in the random access response message (RA MSG2) of FIG. 21. The terminal 410 may receive the random access response message (RA MSG2) from the first base station 420, and identify the information included in the random access response message (RA MSG2). Also, the terminal 410 may transmit uplink data (or control signaling information) to the first base station 420.

The simplified random access procedure described with reference to FIG. 21 and FIG. 22 may be selectively performed according to whether the radio access procedure attempted by the terminal is the initial access, type of the terminal, or a service property. For example, in case of the non-initial access, an access attempt by an IoT device (or MTC device), an access initiated for transmitting a small amount of data, or a service requiring low latency, the simplified random access procedure may be performed.

The base station (e.g., the first base station 420, the second base station 430) may inform, to the terminal 410, whether the base station (or cell) allows the simplified random access procedure, a condition for allowing the terminal 410 to attempt the simplified random access procedure, and the like. The base station may transmit the information related to the simplified random access procedure to the terminal 410 through system information transmitted in a broadcast manner, control signaling information transmitted in a multicast manner, or a dedicated control message.

The information on whether or not the simplified random access procedure is allowed may include information on whether the corresponding base station allows, restricts, or partially prohibits an access attempt using the simplified random access procedure to the terminal in the service area. In the case of the partial prohibition, the base station may transmit information on a condition for the prohibition. When the simplified random access procedure is prohibited or the restriction condition is satisfied, the terminal 410 may perform the random access procedure described with reference to FIG. 4 and FIG. 5.

The terminal 410 may perform the simplified random access procedure only when the condition for allowing the simplified random access procedure is satisfied. For example, the terminal 410 may perform the simplified random access procedure when a measured radio channel quality satisfies a range set by the base station. Here, the radio channel quality may include at least one of RSSI, RSCP, RSRP, and RSRQ.

The random access preambles in the random access procedures described with reference to FIGS. 4 and 5 and the random access procedures described with reference to FIGS. 21 and 22 may be configured identically. For example, in the above-described random access procedures, the random access preamble may be generated by the same code generation formula. In the random access procedure of FIGS. 4 and 5 and the random access procedure of FIGS. 21 and 22, the radio resources or the random access preamble indexes for the transmission of the random access preamble may be configured differently. The first base station 420 may determine whether the random access procedure is the simplified procedure by checking the radio resources through which the random access preamble is transmitted.

The embodiments of the uplink messages described with reference to FIGS. 6 to 20 may be applied to the random access request message of FIGS. 21 and 22 (e.g., the random access request message in the step S620 of FIG. 21, the random access request message in the step S720 of FIG. 22), or the uplink data described above as RA MSG3 (e.g., the uplink message in the step S640 of FIG. 21, the uplink message in the step S740 of FIG. 22). That is, the method of configuring the uplink message described with reference to FIGS. 6 to 20 may be applied to configure the random access payload in the random access request messages of FIGS. 21 and 22, or applied to configure the uplink message to be transmitted first after the terminal receives the random access response message. The random access payload may include at least one field indicating the format of the random access payload.

The random access payload may include an IDI field indicating the length of the identifier of the terminal 410 included in the random access payload. When the identifier of the terminal 410 is classified into only a long ID and a short ID, the random access payload may include the IDI field represented by one bit. When the identifier of the terminal 410 is classified into three or more, the random access payload may include the IDI field having a size of 2 bits or more.

As another example, the terminal 410 may be allocated radio resources grouped according to the length of the identifier of the terminal 410, and may transmit the random access request message using radio resources corresponding to the length of the identifier of the terminal 410. In this case, the first base station 420 may determine the length of the identifier of the terminal 410 by identifying the radio resource through which the random access request message is transmitted. Accordingly, the IDI field may be omitted in the random access payload.

The random access payload may include an FI field that indicates what information included in the random access payload is. The FI field may indicate what information is included in the random access payload. The FI field may indicate a configuration format of the random access payload. The FI field may be integrated with the IDI field and represented as a FI-1 field.

The random access payload may include a size field (or LI field) indicating the size of the random access payload (or the size of the uplink data included in the random access payload). The format of the random access payload may be predefined according to the size of the random access payload. The first base station 420 may determine the format of the random access payload by identifying the size of the random access payload from the size field.

The random access payload may include a DC field indicating the type of information included in the random access payload. The DC field may indicate whether the information included in the random access payload is data or control signaling information. When the DC field is represented by a plurality of bits, the terminal 410 may use the DC field to separately indicate the data (or, control signaling information) according to a protocol layer (e.g., physical layer, RRC layer, RLC layer, MAC layer, higher layer (e.g., NAS), and the like). As another example, the terminal 410 may indicate objective, cause, form, or type of each of the data (or, control signaling information) by using the DC field.

The arrangement order of the above-described fields in the random access payload may be variously changed. When the IDI field and the FI field are represented by the FI-1 field, the FI-1 field may be placed at the front in the random access payload. When the first base station 420 is able to determine the size of the identifier of the terminal 410 based on the radio resources through which the random access request message is transmitted, the identifier of the terminal 410 may be arranged before the above-described fields. The arrangement order of the fields may vary depending on byte alignment, processing, and the like.

The IDI field may be represented by a field combined with at least one of the other fields as well as the FI field. In addition, the terminal 410 may integrate a plurality of fields into one field.

Figure 23:
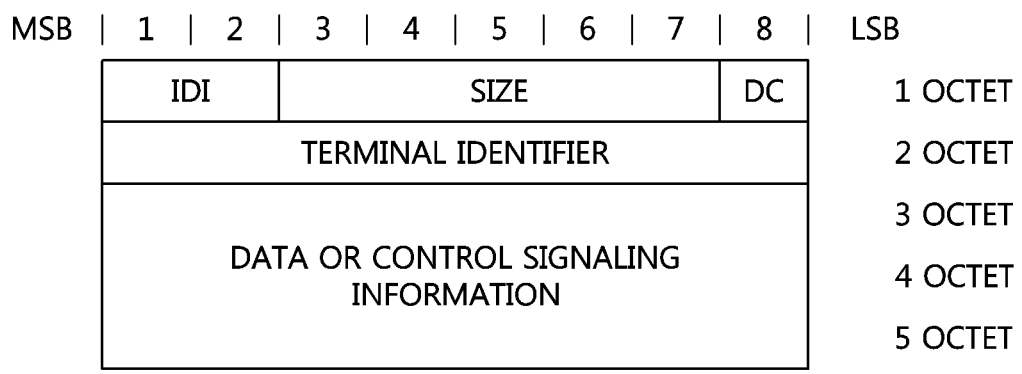
FIG. 23 is a conceptual diagram illustrating a first embodiment of a random access payload.

FIG. 23 is a conceptual diagram illustrating a first embodiment of a random access payload.

Referring to FIG. 23, the random access payload of the random access request message may include an IDI field, a size field, a DC field, a terminal identifier field, a data field (or, a control signaling information field), and the like. The IDI field set to '00' may indicate that the identifier of the terminal 410 is a short ID. In this case, the size of the identifier of the terminal may be 8 bits. The size field may indicate that the size of the random access payload is 40 bits. As another example, the size field may indicate that the size of the remaining region (e.g., the region where the data (or, control signaling information) is located) excluding the IDI field, the size field, the DC field, and the terminal identifier field in the random access payload is 24 bits. The DC field may indicate whether the information included in the random access payload is the data or the control signaling information.

Figure 24:
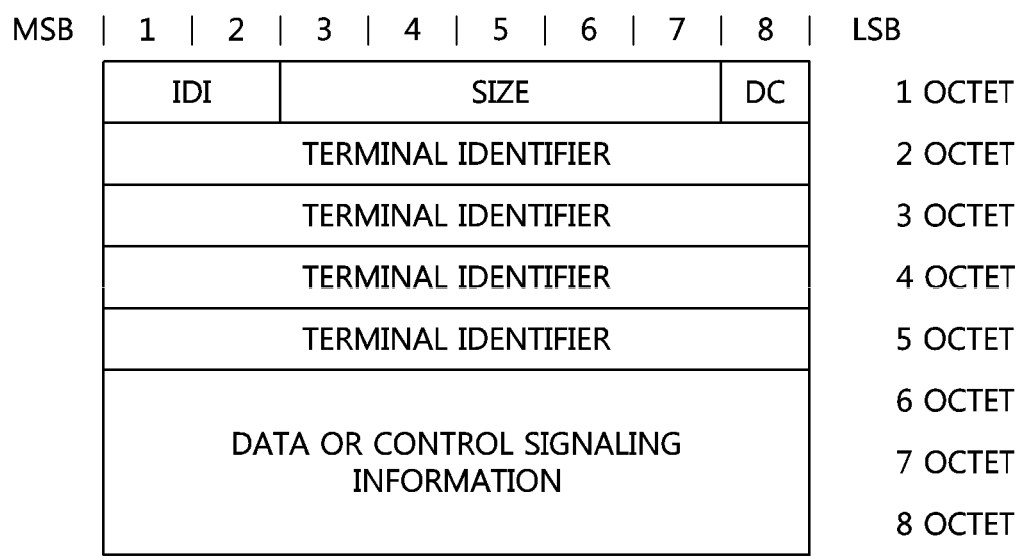
FIG. 24 is a conceptual diagram illustrating a second embodiment of a random access payload.

FIG. 24 is a conceptual diagram illustrating a second embodiment of a random access payload.

Referring to FIG. 24, the random access payload of the random access request message may include an IDI field, a size field, a DC field, a terminal identifier field, a data field (or, a control signaling information field), and the like. The IDI field set to '00' may indicate that the identifier of the terminal 410 is a long ID. In this case, the size of the identifier of the terminal may be 32 bits. The size field may indicate that the size of the random access payload is 64 bits. As another example, the size field may indicate that the size of the remaining region (e.g., the region where the data (or, control signaling information) is located) excluding the IDI field, the size field, the DC field, and the terminal identifier field in the random access payload is 24 bits. The DC field may indicate whether the information included in the random access payload is the data or the control signaling information.

FIGS. 23 and 24 illustratively show a case where the random access payload includes an IDI field, a size field, a DC field, a terminal identifier field, and a data field (or, a control signaling information field). However, the embodiment is not limited thereto. The embodiments of the uplink message described with reference to FIGS. 6 to 20 may be applied to the configuration of the random access payload. The terminal 410 may selectively include a required field among the fields shown in FIGS. 6 to 20 in the random access payload.

In the above description, the case where the identifier of the terminal 410 has a size of 8 bits to 32 bits has been described, but the embodiment is not limited thereto. For example, the size of the identifier of the terminal 410 may be set between 8 bits and 256 bits, depending on the requirements or needs of the system. The identifier of the terminal 410 may be a unique identifier of the terminal 410 or a group identifier capable of identifying a terminal group to which the terminal 410 belongs.

The size of the data indicated by the LI field and the size of the payload indicated by the size field, respectively, may be expressed in units of bits, bytes, and the like. As another example, each of the size of the data indicated by the LI field and the size of the payload indicated by the size field may be represented in units of a minimum allocation unit of radio resources used for scheduling (e.g., resource element (RE), slot, mini-slot, subframe, and the like).

The radio access attempt reason may include information indicating the initial access or the non-initial access. The RA attempt field included in the uplink message of FIGS. 4 and 5 or the random access payload of the random access request message of FIGS. 21 and 22 may indicate the initial access or the non-initial access.

The uplink message and the random access payload may not include a field indicating the format of the message. In this case, the information included in the uplink message and the random access payload and the format of the message may be fixed without being variable. The size and arrangement order (or arrangement locations) of the information included in the uplink message and the random access payload may be predetermined.

Even when the uplink message and the random access payload do not include a field indicating the format of the message, the information included in the uplink message and the random access payload may be changed. The first base station 420 may determine the information included in the uplink message or the random access payload by identifying the radio resources through which the uplink message or the random access request message is transmitted.

Also, the terminal 410 may use first radio resources for transmission of the random access preamble and second radio resources for transmission of the random access payload hen performing the simplified random access procedure. The first and second radio resources may be different. The terminal 410 may configure the radio resources for transmitting the random access request message of FIGS. 21 and 22 differently from the radio resources for transmitting the uplink messages of FIGS. 4 and 5. Here, the radio resources may be radio resources (e.g., RA radio resources) configured or allocated for the random access procedure. In the frequency axis, the radio resources may be indicated by an indicator or an index for identifying frequency band, sub-band in the system bandwidth, subcarrier, or beam according to a beamforming technique, and the like. Also, in the time axis, the radio resources may be indicated by an indicator, an index, or a number indicating transmission (or, reception) time (e.g., period, duration, window) units such as radio frame, subframe, transmission time interval (TTI), slot, mini-slot, or symbol.

In order to differently configure the radio resources allocated for each message, configuration for the radio resources (e.g., radio resource location or index in the time axis or the frequency axis, the index of the RA preamble, transmission timing, offset, etc.) allocated for each message may be different.

The terminal 410 may configure different information to be included in the uplink message or the random access payload depending on whether the random access procedure is the initial access or the non-initial access. For example, in the case of the initial access procedure, the terminal 410 may include a long ID (e.g., S-TMSI) in the random access payload or the uplink message. In the case of the non-initial access procedure, the terminal 410 may include a short ID (e.g., C-RNTI) in the random access payload or the uplink message. The terminal 410 may configure contents, size, and arrangement order of the information to be included in the random access payload or the uplink message differently for the initial access procedure and the non-initial access procedure. However, the contents, size, and arrangement order of the information included in the random access payload or the uplink message may be fixed for each of the initial access procedure and the non-initial access procedure.

The method of configuring the random access payload and the uplink message of the random access request message is not limited to the above description. The terminal 410 may include necessary fields of the plurality of fields in the random access payload or the uplink message. Also, the terminal 410 may represent at least two of the fields described above as one field.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a wireless communication system, the operation method comprising:
   receiving, from a base station, configuration information for a 2-step random access (RA) procedure;
   when an execution condition according to a first information element included in the configuration information is satisfied, transmitting, to the base station, an RA message (MSG) 1 including an RA preamble and an RA payload based on the configuration information; and receiving, from the base station, an RA MSG 2 in response to the RA MSG 1, wherein the first information element is a reference signal received power (RSRP) condition, and the 2-step RA procedure is performed instead of a 4-step RA procedure when channel quality between the terminal and the base station satisfies the RSRP condition.

2. The operation method according to claim 1, wherein the RA payload includes one or more of a terminal identifier, uplink data, and control information.

3. The operation method according to claim 1, wherein a first radio resource in which the RA preamble is transmitted is different from a second radio resource in which the RA payload is transmitted, and the first radio resource and the second radio resource are configured based on a mapping relationship.

4. The operation method according to claim 1, wherein the RA payload is transmitted using a second radio resource after a time domain offset from a first radio resource in which the RA preamble is transmitted.

5. The operation method according to claim 1, wherein the RA payload is transmitted using a second radio resource indicated by a frequency domain offset.

6. The operation method according to claim 1, wherein the RA payload is transmitted according to a transmission timing configured by the base station.

7. The operation method according to claim 1, wherein a sequence of the RA preamble in the 2-step RA procedure and a sequence of a RA preamble in a 4-step RA procedure are determined based on a same code generation scheme.

8. The operation method according to claim 1, wherein the RA MSG 2 includes a terminal identifier included in the RA MSG 1, and the 2-step RA procedure is terminated when the RA MSG 2 is received.

9. The operation method according to claim 1, wherein the RA payload includes a field indicating a format of the RA payload.

10. An operation method of a base station in a wireless communication system, the operation method comprising:
    transmitting, to a terminal, configuration information for a 2-step random access (RA) procedure;
    receiving, from the terminal, a RA message (MSG) 1 by performing a monitoring operation using the configuration information; and
    when the RA MSG 1 is a 2-step RA MSG 1 of the 2-step RA procedure, transmitting, to the terminal, a 2-step RA MSG 2 of the 2-step RA procedure in response to the 2-step RA MSG 1,
    wherein a transmission resource for an RA preamble included in the 2-step RA MSG 1 is configured to be different from a transmission resource for an RA preamble included in a 4-step RA MSG 1, and the 2-step RA MSG 1 is distinguished from the 4-step RA MSG 1 based on the transmission resource.

11. The operation method according to claim 10, wherein the 2-step RA MSG 1 includes the RA preamble and an RA payload, and the RA payload includes one or more of a terminal identifier, uplink data, and control information.

12. The operation method according to claim 10, wherein the 2-step RA MSG 2 includes a terminal identifier included in the 2-step RA MSG 1, and the 2-step RA procedure is terminated when the 2-step RA MSG 2 is received at the terminal.

13. An operation method of a base station in a wireless communication system, the operation method comprising:
    transmitting, to a terminal, configuration information for a 2-step random access (RA) procedure;
    receiving, from the terminal, an RA message (MSG) 1 by performing a monitoring operation using the configuration information; and
    when the RA MSG 1 is a 2-step RA MSG 1 of the 2-step RA procedure, transmitting, to the terminal, a 2-step RA MSG 2 of the 2-step RA procedure in response to the 2-step RA MSG 1,
    wherein a transmission resource for a RA preamble included in the 2-step RA MSG 1 is configured to be identical with a transmission resource for a RA preamble included in a 4-step RA MSG 1, and the 2-step RA MSG 1 is distinguished from the 4-step RA MSG 1 based on a RA preamble index.

14. The operation method according to claim 10, wherein the configuration information includes a reference signal received power (RSRP) condition, and the 2-step RA MSG 1 is received from the terminal when channel quality between the terminal and the base station satisfies the RSRP condition.

15. The operation method according to claim 10, wherein the 2-step RA MSG 1 includes the RA preamble and an RA payload, and a first radio resource in which the RA preamble is transmitted is configured to be different from a second radio resource in which the RA payload is transmitted.

16. The operation method according to claim 15, wherein the second radio resource is indicated by a frequency domain offset.

17. The operation method according to claim 15, wherein a transmission timing of the RA payload is configured by the base station.

18. The operation method according to claim 15, wherein the second radio resource is located after a time domain offset from the first radio resource.

* * * * *